United States Patent
Rose et al.

(10) Patent No.: US 8,321,256 B2
(45) Date of Patent: Nov. 27, 2012

(54) SYSTEMS AND METHODS RELATING TO AN OPPORTUNITY DISTRIBUTION ENGINE AND DISTRIBUTION SIMULATION

(75) Inventors: C. Michael Rose, San Jose, CA (US); Peter D. Mathews, San Francisco, CA (US); Jeffrey E. Sward, Huntington Beach, CA (US); Glenn R. Dunkle, Irvine, CA (US); John L. Dohoney, Corona, CA (US); Glenn S. Davis, Irvine, CA (US)

(73) Assignee: Autobytel Inc., Irvine, CA (US)

( * ) Notice: Subject to any disclaimer, the term of this patent is extended or adjusted under 35 U.S.C. 154(b) by 1271 days.

(21) Appl. No.: 11/971,823

(22) Filed: Jan. 9, 2008

(65) Prior Publication Data
US 2008/0201205 A1 Aug. 21, 2008

Related U.S. Application Data

(60) Provisional application No. 60/879,789, filed on Jan. 9, 2007.

(51) Int. Cl.
G06F 17/00 (2006.01)
(52) U.S. Cl. .................................................. 705/7.22
(58) Field of Classification Search .................. 705/7.22
See application file for complete search history.

(56) References Cited

U.S. PATENT DOCUMENTS

| | | | |
|---|---|---|---|
| 7,047,206 B1 | 5/2006 | Schultze | |
| 7,130,865 B2 | 10/2006 | Moore | |
| 7,778,885 B1 | 8/2010 | Semprevivo et al. | |
| 7,899,707 B1 | 3/2011 | Mesaros | |
| 2002/0194050 A1 | 12/2002 | Nabe et al. | |
| 2003/0115216 A1 | 6/2003 | Moore | |
| 2004/0068520 A1 | 4/2004 | Masaoka | |
| 2004/0143473 A1 | 7/2004 | Tivey et al. | |
| 2004/0143476 A1 | 7/2004 | Kapadia et al. | |
| 2004/0143483 A1 | 7/2004 | Tivey et al. | |
| 2004/0143484 A1* | 7/2004 | Kapadia et al. | 705/10 |

(Continued)

FOREIGN PATENT DOCUMENTS

| | | |
|---|---|---|
| JP | 2004-326481 A | 11/2004 |
| WO | WO 00-72210 A1 | 11/2000 |

OTHER PUBLICATIONS

International Search Report of PCT Application No. PCT/US2008/050673, date of mailing May 19, 2008, 11 pgs.

(Continued)

*Primary Examiner* — Thomas Dixon
(74) *Attorney, Agent, or Firm* — Knobbe, Martens, Olson & Bear, LLP

(57) ABSTRACT

Opportunity distribution systems and methods distribute business opportunities received from lead sources for routing to one or more destination businesses that will make use the opportunity, such as an opportunity to place a webpage advertisement on a webpage that is being served to a viewer. The system identifies a set of most profitable destinations for each opportunity, for each routing, while complying with business rules associated with the opportunity source and the destination businesses. System variables associated with the lead source and the destinations may be advantageously adjusted to maintain desired flow rate and quality levels of leads to each destination and to maximize profit to the system. A system administrator module and log of lead transactions allows the system to review previous performance and to carry out simulations in order to identify desired adjustments to system variables.

7 Claims, 21 Drawing Sheets

U.S. PATENT DOCUMENTS

| | | |
|---|---|---|
| 2004/0172266 A1 | 9/2004 | Sheinson et al. |
| 2005/0044036 A1 | 2/2005 | Harrington et al. |
| 2005/0125334 A1 | 6/2005 | Masella et al. |
| 2005/0125422 A1 | 6/2005 | Hirst |
| 2005/0171859 A1 | 8/2005 | Harrington et al. |
| 2006/0041500 A1 | 2/2006 | Diana et al. |
| 2006/0080229 A1* | 4/2006 | Masella et al. ............... 705/38 |
| 2006/0085283 A1 | 4/2006 | Griffiths |
| 2006/0129423 A1 | 6/2006 | Sheinson et al. |
| 2006/0155642 A1* | 7/2006 | Pettersen ................. 705/39 |
| 2006/0200360 A1* | 9/2006 | Razletovskiy ............. 705/1 |
| 2006/0265259 A1 | 11/2006 | Diana et al. |
| 2007/0038526 A1 | 2/2007 | Painter et al. |
| 2008/0154762 A1 | 6/2008 | Campbell et al. |
| 2009/0254436 A1 | 10/2009 | Dagum |
| 2010/0174571 A1 | 7/2010 | Jerome et al. |
| 2010/0332291 A1 | 12/2010 | Smith |

OTHER PUBLICATIONS

International Search Report of PCT Application No. PCT/US2008/050680, date of mailing May 22, 2008, 12 pgs.
International Search Report of PCT Application No. PCT/US2008/050682, date of mailing May 21, 2008, 11 pgs.
International Search Report of PCT Application No. PCT/US2008/050684, date of mailing May 21, 2008, 11 pgs.
International Search Report of PCT Application No. PCT/US2008/050685, date of mailing May 22, 2008, 11 pgs.

* cited by examiner

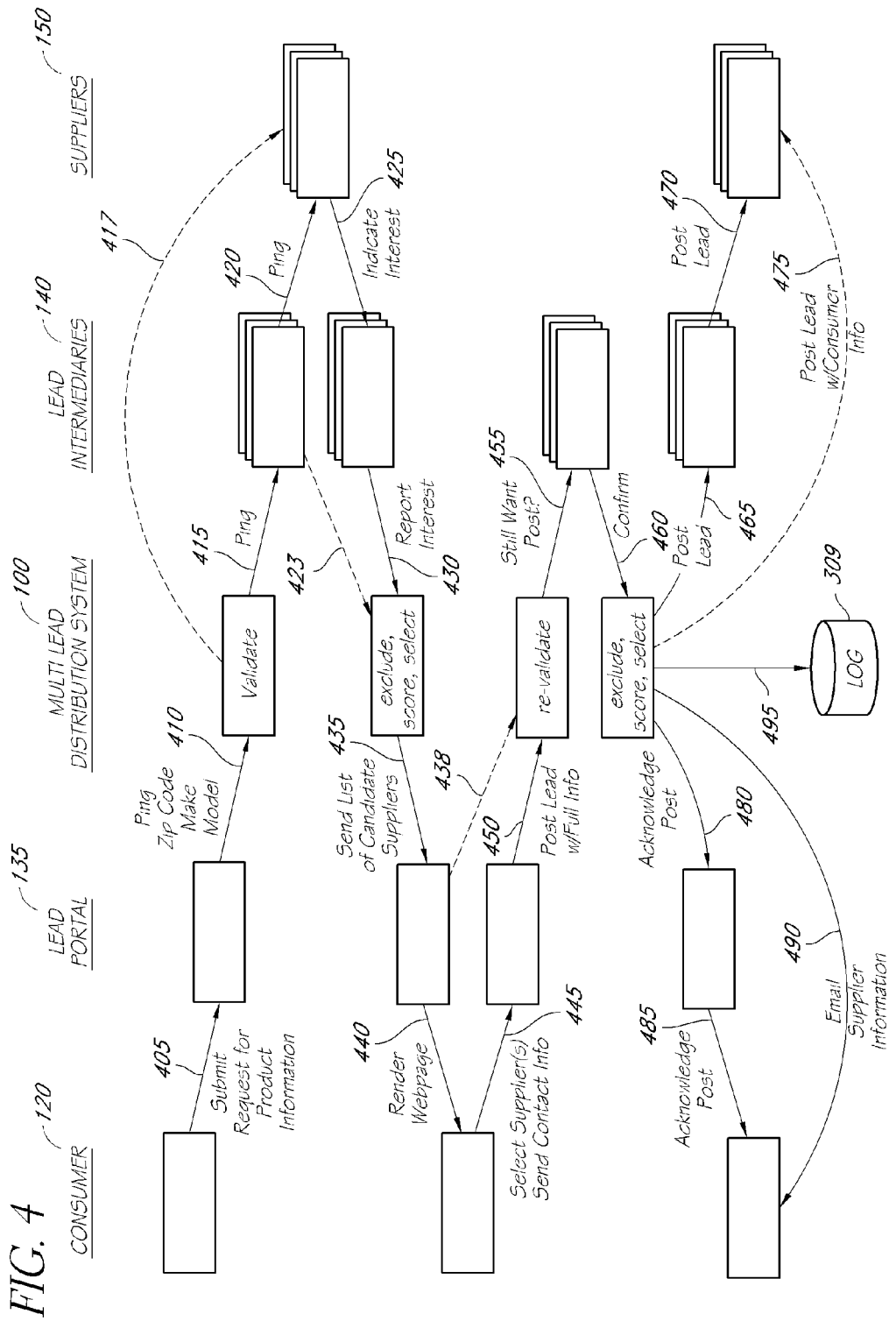

Margin Multi-Select Placement 1

$$selectedmargin_1 = max\left(\left\{\bigcup_{i=1}^{n}(rev_i - cost_i)\right\}\right)$$

$$leastloss_1 = max\left(\left\{\bigcup_{i=1}^{n}\left\{\begin{array}{l}(rev_i - cost_i) \text{ when } (rev_i - cost_i) \leq 0 \text{ and } lossallowed_1 \\ null \text{ otherwise}\end{array}\right.\right\}\right)$$

$$selectedsupplier_1 = \left\{\begin{array}{l}supplier(selectedmargin_1) \text{ when } selectedmargin_1 > 0 \\ supplier(leastloss_1) \text{ when } selectedmargin_1 \leq 0 \text{ and } leastloss_1 \text{ is not null} \\ null \text{ otherwise}\end{array}\right\}$$

Margin Multi-Select Placement 2

$$selectedmargin_2 = max\left(\left\{\bigcup_{i=1}^{n-1}(rev_i - cost_i)\right\}\right)$$

$$leastloss_2 = max\left(\left\{\bigcup_{i=1}^{n-1}\left\{\begin{array}{l}(rev_i - cost_i) \text{ when } (rev_i - cost_i) \leq 0 \text{ and } lossallowed_2 \\ null \text{ otherwise}\end{array}\right.\right\}\right)$$

$$selectedsupplier_2 = \left\{\begin{array}{l}supplier(selectedmargin_2) \text{ when } selectedmargin_1 > 0 \\ supplier(leastloss_2) \text{ when } selectedmargin_2 \leq 0 \text{ and } leastloss_2 \text{ is not null} \\ null \text{ otherwise}\end{array}\right\}$$

Margin Multi-Select Placement k $$selectedmargin_k = max\left(\left\{\bigcup_{i=1}^{n-k+1}(rev_i - cost_i)\right\}\right)$$

$$leastloss_k = max\left(\left\{\bigcup_{i=1}^{n-k+1}\left\{\begin{array}{l}(rev_i - cost_i) \text{ when } (rev_i - cost_i) \leq 0 \text{ and } lossallowed_k \\ null \text{ otherwise}\end{array}\right.\right\}\right)$$

$$selectedsupplier_k = \left\{\begin{array}{l}supplier(selectedmargin_k) \text{ when } selectedmargin_k > 0 \\ supplier(leastloss_k) \text{ when } selectedmargin_k \leq 0 \text{ and } leastloss_k \text{ is not null} \\ null \text{ otherwise}\end{array}\right\}$$

| Row | Lead Intermediary ID | Include All Portals | Revenue Score |
|---|---|---|---|
| 1 | 1 | No | 20.00 |
| 2 | 3 | No | 22.50 |
| 3 | 5 | Yes | 21.00 |
| 4 | 7 | No | 6.00 |
| 5 | 23 | Yes | 9.00 |
| 6 | 56 | No | 6.00 |

FIG. 8B 820

Pre-Selection

| Row | supplier_name | Revenue Score | Current Placement Margin Score | Intermediary_ID | travel_distance_dec | postal_code_ch | Rolling actual # leads | rolling target # leads | DP Default Allow | SG DP Allow | SG DP Current Placement Allow | Excluded by blocking current placement | Negative Margin Allowed | Excluded by run rate – run stop | Excluded by Rank – Quality Group | Excluded by High Demand Vehicle | Eligible for current placement | Already Placed | Placed in slot Number |
|---|---|---|---|---|---|---|---|---|---|---|---|---|---|---|---|---|---|---|---|
| 1 | Matthews Ford | 20.00 | | 1 | 4.53 | 92618 | 9 | 8 | N | Y | | | | Y | na | N | | | |
| 2 | Matthews Ford | 21.00 | | 5 | 4.53 | 92618 | 4 | 60 | Y | | | | | N | na | N | | | |
| 3 | SJN Ford | 6.00 | | 56 | 6.39 | 92782 | | | N | Y | | | | N | na | N | | | |
| 4 | Rose Ford Uptown | 20.00 | | 1 | 6.39 | 92782 | 7 | 6 | N | Y | | | | Y | na | N | | | |
| 5 | Rose Ford Uptown | 9.00 | | 23 | 6.39 | 92782 | 2 | 50 | Y | | | | | N | na | N | | | |
| 6 | Rose Ford Downtown | 20.00 | | 1 | 10.72 | 92648 | 3 | 86 | | | | | | N | na | N | | | |
| 7 | Rose Ford Downtown | 9.00 | | 23 | 10.72 | 92648 | 20 | 125 | | | | | | N | na | N | | | |
| 8 | Amir Ford | 22.50 | | 3 | 12.33 | 92688 | 13 | 75 | | Y | | | | N | na | N | | | |
| 9 | Mills Ford | 6.00 | | 56 | 15.50 | 92801 | | | N | | | | | N | na | N | | | |
| 10 | JS Ford Lincoln Mercury | 6.00 | | 56 | 20.75 | 90703 | | | N | | | | | N | na | N | | | |

Level 1 Placement

| Row | supplier_name | Revenue Score | Current Placement Margin Score | Intermediary_ID | travel_distance_dec | postal_code_ch | Rolling actual # leads | rolling target # leads | DP Default Allow | SG DP Allow | SG DP Current Placement Allow | Excluded by blocking current placement | Negative Margin Allowed | Excluded by run rate - run stop | Excluded by Rank - Quality Group | Excluded by High Demand Vehicle | Eligible for current placement | Already Placed | Placed in slot Number |
|---|---|---|---|---|---|---|---|---|---|---|---|---|---|---|---|---|---|---|---|
| 1 | Matthews Ford | 20.00 | 8.00 | 1 | 4.53 | 92618 | 9 | 8 | N | Y | Y | N | N | Y | na | N | N | | |
| 2 | Matthews Ford | 21.00 | 9.00 | 5 | 4.53 | 92618 | 4 | 60 | Y | | Y | N | N | N | na | N | Y | | |
| 3 | SJN Ford | 6.00 | -6.00 | 56 | 6.39 | 92782 | | | N | Y | N | Y | N | N | na | N | N | | |
| 4 | Rose Ford Uptown | 20.00 | 8.00 | 1 | 6.39 | 92782 | 7 | 6 | N | Y | Y | N | N | Y | na | N | N | | |
| 5 | Rose Ford Uptown | 9.00 | -3.00 | 23 | 6.39 | 92782 | 2 | 50 | Y | | N | Y | N | N | na | N | N | | |
| 6 | Rose Ford Downtown | 20.00 | 8.00 | 1 | 10.72 | 92648 | 3 | 86 | | Y | Y | N | N | N | na | N | Y | | |
| 7 | Rose Ford Downtown | 9.00 | -3.00 | 23 | 10.72 | 92648 | 20 | 125 | | | N | Y | N | N | na | N | N | | |
| 8 | Amir Ford | 22.50 | 10.50 | 3 | 12.33 | 92688 | 13 | 75 | N | Y | Y | N | N | N | na | N | Y | Y | 1 |
| 9 | Mills Ford | 6.00 | -6.00 | 56 | 15.50 | 92801 | | | N | | N | Y | N | N | na | N | N | | |
| 10 | JS Ford Lincoln Mercury | 6.00 | -6.00 | 56 | 20.75 | 90703 | | | N | | N | Y | N | N | na | N | N | | |

Level 3 Placement

| Row | supplier_name | Revenue Score | Current Placement Margin Score | Intermediary_ID | travel_distance_dec | postal_code_ch | Rolling actual # leads | rolling target # leads | DP Default Allow | SG DP Allow | SG DP Current Placement Allow | Excluded by blocking current placement | Negative Margin Allowed | Excluded by run rate - run stop | Excluded by Rank - Quality Group | Excluded by High Demand Vehicle | Eligible for current placement | Already Placed | Placed in slot Number |
|---|---|---|---|---|---|---|---|---|---|---|---|---|---|---|---|---|---|---|---|
| 1 | Matthews Ford | 20.00 | 10.00 | 1 | 4.53 | 92618 | 9 | 8 | N | Y |  | N | N | Y | na | N | N | Y |  |
| 2 | Matthews Ford | 21.00 | 11.00 | 5 | 4.53 | 92618 | 4 | 60 | Y |  | Y | N | N | N | na | N | N | Y | 2 |
| 3 | SJN Ford | 6.00 | -4.00 | 56 | 6.39 | 92782 |  |  | N | Y | Y | N | N | N | na | N | Y |  |  |
| 4 | Rose Ford Uptown | 20.00 | 10.00 | 1 | 6.39 | 92782 | 7 | 6 | N |  |  | N | N | Y | na | N | N |  |  |
| 5 | Rose Ford Uptown | 9.00 | -1.00 | 23 | 6.39 | 92782 | 2 | 50 | Y | Y |  | N | Y | N | na | N | Y |  |  |
| 6 | Rose Ford Downtown | 20.00 | 10.00 | 1 | 10.72 | 92648 | 3 | 86 | N |  | Y | N | N | N | na | N | Y | Y | 3 |
| 7 | Rose Ford Downtown | 9.00 | -1.00 | 23 | 10.72 | 92648 | 20 | 125 | Y | Y |  | N | Y | N | na | N | Y |  |  |
| 8 | Amir Ford | 22.50 | 12.50 | 3 | 12.33 | 92688 | 13 | 75 | N |  | Y | N | N | N | na | N | Y | Y | 1 |
| 9 | Mills Ford | 6.00 | -4.00 | 56 | 15.50 | 92801 |  |  | N | Y |  | N | N | N | na | N | N |  |  |
| 10 | JS Ford Lincoln Mercury | 6.00 | -4.00 | 56 | 20.75 | 90703 |  |  | N |  |  | N | N | N | na | N | Y |  |  |

FIG. 8F  820

Level 4 Placement

| Row | supplier_name | Revenue Score | Current Placement Margin Score | Intermediary_ID | travel_distance_dec | postal_code_ch | Rolling actual # leads | rolling target # leads | DP Default Allow | SG DP Allow | SG DP Current Placement Allow | Excluded by blocking current placement | Negative Margin Allowed | Excluded by run rate – run stop | Excluded by Rank – Quality Group | Excluded by High Demand Vehicle | Eligible for current placement | Already Placed | Placed in slot Number |
|---|---|---|---|---|---|---|---|---|---|---|---|---|---|---|---|---|---|---|---|
| 1 | Matthews Ford | 20.00 | 10.00 | 1 | 4.53 | 92618 | 9 | 8 | N | Y | | N | N | Y | na | N | N | Y | |
| 2 | Matthews Ford | 21.00 | 11.00 | 5 | 4.53 | 92618 | 4 | 60 | Y | | Y | N | N | N | na | N | N | Y | 2 |
| 3 | SJN Ford | 6.00 | -4.00 | 56 | 6.39 | 92782 | | | N | Y | | N | N | N | na | N | Y | | |
| 4 | Rose Ford Uptown | 20.00 | 10.00 | 1 | 6.39 | 92782 | 7 | 6 | N | Y | Y | N | N | Y | na | N | N | Y | 4 |
| 5 | Rose Ford Uptown | 9.00 | -1.00 | 23 | 6.39 | 92782 | 2 | 50 | Y | | | N | Y | N | na | N | Y | Y | 3 |
| 6 | Rose Ford Downtown | 20.00 | 10.00 | 1 | 10.72 | 92648 | 3 | 86 | N | Y | Y | N | N | N | na | N | N | Y | |
| 7 | Rose Ford Downtown | 9.00 | -1.00 | 23 | 10.72 | 92648 | 20 | 125 | Y | | Y | N | Y | N | na | N | N | Y | 1 |
| 8 | Amir Ford | 22.50 | 12.50 | 3 | 12.33 | 92688 | 13 | 75 | N | Y | Y | N | N | N | na | N | N | Y | |
| 9 | Mills Ford | 6.00 | -4.00 | 56 | 15.50 | 92801 | | | N | | | N | N | N | | N | Y | | |
| 10 | JS Ford Lincoln Mercury | 6.00 | -4.00 | 56 | 20.75 | 90703 | | | N | | | N | N | N | | N | Y | | |

FIG. 9

View Control Set By Source Group Product Family

905 — 1791 NXB Lead Distribution System
Source Group ID    Product Family    1 NC New Car
[1791]    [New Car ▽]    [Fetch New]

○ Show All Active Programs    ○ Show Only Active Not blocked Programs    [Refresh]

[Move to Configure Source Group Product Family]

910 { Allow Multi Sell: Y    915 { tfdf Ping Reply Type True False with Dealer List All Information
Multi Sell Limit: 4              tf Ping Reply Type True False Only

920

| Level | Actual Cost | Cost Score | Quality Rank |
|---|---|---|---|
| 1 | 12.0000 | 12.0000 | AA |
| 2 | 8.0000 | 8.0000 | AA |
| 3 | 8.0000 | 8.0000 | AA |
| 4 | 8.0000 | 8.0000 | AA |

[Sort by Intermediary]    [Sort by Realized Margin Placement One]

925
Active Program - 1 New Car Configured Referral
Program Defaults All Source Groups
Average Actual Revenue: 25.5000    Actual Revenue: 25.5000    Revenue Score: 30.0000
Maximum distance: 100    Includes All Affiliates: N
PRF Match Type    2 Exact Match
Lead Deduplication Type    1 dedup Deduplicate All Standard

[Update This Source Group Product Family Program]    [Update This Program]

930
Program Overrides This Source Group and Product Family
Allow Placement: Y    Lead Sell Maximum: 2    Revenue Score Override: n/a 935
Program Overrides This Source Group Product Family and Level

| Level | Allow Placement | Allow Negative Margin | Revenue Score | Cost Score | Margin Score |
|---|---|---|---|---|---|
| 1 | Y | Y | 30.0000 | 12.0000 | 18.0000 |
| 2 | Y | Y | 30.0000 | 8.0000 | 20.0000 |
| 3 | Y | Y | 30.0000 | 8.0000 | 20.0000 |
| 4 | Y | Y | 30.0000 | 8.0000 | 20.0000 | autobytel

900

SYSTEMS AND METHODS RELATING TO AN OPPORTUNITY DISTRIBUTION ENGINE AND DISTRIBUTION SIMULATION

PRIORITY INFORMATION

This application claims the benefit of priority under 35 U.S.C. §119(e) of U.S. Provisional Application No. 60/879,789, filed on Jan. 9, 2007 and titled SYSTEMS AND METHODS RELATING TO A MULTIPLE LEAD DISTRIBUTION ENGINE AND LEAD DISTRIBUTION SIMULATION, the entirety of which is incorporated herein by reference.

INCORPORATION BY REFERENCE

There are four co-pending and commonly owned U.S. patent applications all filed on even date herewith. These applications have the following titles, U.S. patent application Ser. No., Publications dates, and U.S. Publication numbers:

SYSTEMS AND METHODS RELATING TO A LEAD DISTRIBUTION ENGINE THAT ACCOMMODATES INTERNAL AND IMPORTED DESTINATION RELATIONSHIPS, U.S. patent application Ser. No. 11/971,753, which published on Aug. 21, 2008 as U.S. Publ. No. 2008/201,202 A1.

SYSTEMS AND METHODS RELATING TO A LEAD DISTRIBUTION ENGINE THAT ACCOMMODATES INTERNAL AND IMPORTED DESTINATION EXCLUSION RULES, U.S. patent application Ser. No. 11/971,816, which published on Aug. 21, 2008as U.S. Publ. No. 2008/201,184 A1.

SYSTEMS AND METHODS RELATING TO A LEAD DISTRIBUTION ENGINE THAT USES MARGIN SCORES, U.S. patent application Ser. No. 11/971,809, which published on Aug. 21, 2008as U.S. Publ. No. 2008/201,203 A1.

SYSTEMS AND METHODS RELATING TO A LEAD DISTRIBUTION ENGINE WITH QUALITY ASSESSMENT OF LEAD SOURCES, U.S. patent application Ser. No. 11/971,822, which published on Aug. 21, 2008as U.S. Publ. No. 2008/201,204 A1.

All of the above referenced patent applications are hereby incorporated by reference herein in their entireties.

FIELD

The present invention relates to the distribution of consumer leads to suppliers of goods and services.

BACKGROUND

Consumer lead generation is a large and growing industry. The lead generation industry identifies consumers that may be interested in buying products or services and sells contact information for those consumers to suppliers of the products or services of interest. The contact information of the potentially interested consumer, together with the specific product or service of interest to the consumer, is known as a "lead."

Suppliers of the products and/or services of interest buy leads because leads effectively identify consumers that are already interested in the suppliers' products and services. Accordingly, leads often result in a higher percentage of sales per contact than advertising, cold calling, or other forms of salesmanship. For this reason, product and service suppliers are willing to pay for leads from sources that are able to consistently provide leads that result in a relatively high percentage of sales.

A lead distributor obtains leads directly from interested consumers and/or indirectly from other lead sources. When selling the leads, the lead distributor is confronted with a complex set of business interrelationships and complicated contractual agreements that limit the lead distributor's options for lead distribution. For example, some leads may not be sold to certain suppliers of the products and/or services of interest. Other leads can be sold only a limited number of times.

SUMMARY

In view of the complexities of lead distribution, it would be advantageous to provide a flexible and efficient system and method for identifying a set of purchasers that maximizes the profitability on the sale of each lead and/or is otherwise desirable with regard to the business considerations of the lead distributor.

The complex lead sales environment allows for selling a lead to one or more suppliers that are identified on the basis of geographical closeness or on gross revenue, but hampers the ability to identify additional lead purchasers that conform to contractual agreements and other business requirements.

In accordance with the embodiments disclosed herein, the interrelationships between lead generators, lead distributors and the ultimate lead users are taken into account using a lead distribution engine that assists the lead distributor to maximize the profit from the sale of each lead to one or more lead purchasers.

Embodiments of a processor-implemented opportunity distribution engine are described. The opportunity distribution engine is configured to populate a table with stored data about candidate businesses for a business opportunity available for purchase. The stored data includes a least four different types of data values for each candidate business. The opportunity distribution engine is also configured to further populate the table with additional data values about the candidate businesses, such that the additional data values are derived, at least in part, from the stored data values. The opportunity distribution engine is further configured to select, based at least in part on the data values in the populated table, a set of one or more candidate businesses which may purchase the business opportunity.

Embodiments of a method for maintaining an opportunity distribution system are described. The method includes using tables, populated with stored data about businesses that are candidates for purchasing available business opportunities, in order to select a set of one or more preferred candidate businesses that may purchase the business opportunities, such that the stored data includes at least five different types of data for each candidate business. The method also includes storing, for a selected time period, the data from the populated tables and the sets of one or more preferred candidate businesses. The method also includes using modified versions of the stored data to re-populate one or more of the tables in order to select, for each table, a simulated set of preferred candidate businesses. The method further includes comparing a business benefit accrued from allowing the stored sets of preferred candidate businesses to purchase the business opportunities with a simulated business benefit associated with allowing the simulated sets of preferred candidate businesses to simulate purchasing the business opportunities. The method also includes modifying the stored data, based at least in part on the comparison, so that future selections of preferred candidate businesses result in a better business benefit going forward.

Embodiments of a lead distribution engine are described. The lead distribution engine includes a processor-readable storage medium that comprises information about lead sources, lead users, and lead intermediaries. The lead distribution engine also includes a lead source interface module that accepts information from a lead source about a business lead being offered for sale by the lead source. The lead distribution engine further includes a collection module configured to receive information about lead users who are interested in purchasing the business lead and about lead intermediaries who are interested in providing the business lead to one or more of the lead users. The collection module is further configured to organize the information by identifying pairs, each pair comprising a lead user and a lead intermediary who is interested in providing the business lead to the lead user. The lead distribution engine also includes a selection module that is configured to receive the information about the pairs from the collection module, and to access, for each pair, a score from the processor-readable storage medium that is indicative of a level of monetary profit and business gain associated with sale of the business lead to the pair. The selection module is further configured to identify a preferred subset of the pairs, such that each of the pairs in the subset is associated with a desirable score and such that the lead users from the pairs in the subset are different from one another.

Embodiments of a processor-implemented method for distributing a business opportunity available from a source are described. The method includes: partially populating a table with stored data values associated with a set of candidate businesses for purchase of the business opportunity; further populating the table with additional data values that are derived, at least in part, from the stored values; and selecting, based at least in part on the stored values and on the derived values, a set of one or more preferred candidate businesses for purchasing the business opportunity.

Embodiments of a system for maintaining an opportunity distribution system are described. The system includes means for using tables, populated with stored data about businesses that are candidates for purchasing available business opportunities, in order to select a set of one or more preferred candidate businesses that may purchase the business opportunities, such that the stored data includes at least five different types of data for each candidate business. The system includes means for storing, for a selected time period, the data from the populated tables and the sets of one or more preferred candidate businesses. The system also includes means for using modified versions of the stored data to re-populate one or more of the tables in order to select, for each table, a simulated set of preferred candidate businesses. The system also includes means for comparing a business benefit accrued from allowing the stored sets of preferred candidate businesses to purchase the business opportunities with a simulated business benefit associated with allowing the simulated sets of preferred candidate businesses to simulate purchasing the business opportunities. The system also includes means for modifying the stored data, based at least in part on the comparison, so that future selections of preferred candidate businesses result in a better business benefit going forward.

Embodiments of a processor-implemented method are described for offering an opportunity to place an advertisement on a webpage currently being served to a viewer. The method includes: partially populating a table with stored data values associated with a set of candidate businesses for purchase of the webpage advertisement space; further populating the table with additional data values that are derived, at least in part, from the stored values; and selecting, based at least in part on the stored values and on the derived values, a set of one or more preferred candidate businesses for purchasing the webpage advertisement space.

For purposes of summarizing embodiments of the invention, certain aspects, advantages, and novel features of the invention have been described herein. It is to be understood that not necessarily all such aspects, advantages, or novel features will be embodied in any particular embodiment of the invention.

BRIEF DESCRIPTION OF THE DRAWINGS

Embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

FIGS. 3B-1 and 3B-2 are referred to collectively in this Specification as "FIG. 3B".

FIG. 4 is a block diagram that illustrates a flow of data in association with one embodiment of a multi lead distribution system.

FIG. 6B displays one embodiment of a set of formulae that may advantageously be used by a computer to identify a preferred set of intermediary/supplier pairs for receiving a lead.

FIG. 8A is a depiction of a database table with an initial list of potential lead intermediaries to whom a lead may be offered by one embodiment of the multi lead distribution system.

FIG. 8B is a depiction of a database table with a list of potential suppliers to whom the lead may be offered by one embodiment of the multi lead distribution system.

FIG. 8C is a depiction of the database table of FIG. 8B after one embodiment of the multi lead distribution system has selected a first supplier to whom to offer the lead.

FIG. 8E is a depiction of the database table of FIG. 8D after one embodiment of the multi lead distribution system has selected a third supplier to whom to offer the lead.

FIG. 8F is a depiction of the database table of FIG. 8E after one embodiment of the multi lead distribution system has selected a fourth supplier to whom to offer the lead.

FIG. 9 is a screen shot that illustrates one embodiment of a control configuration screen for managing embodiments of the multi lead distribution system.

DESCRIPTION

Figure 1:
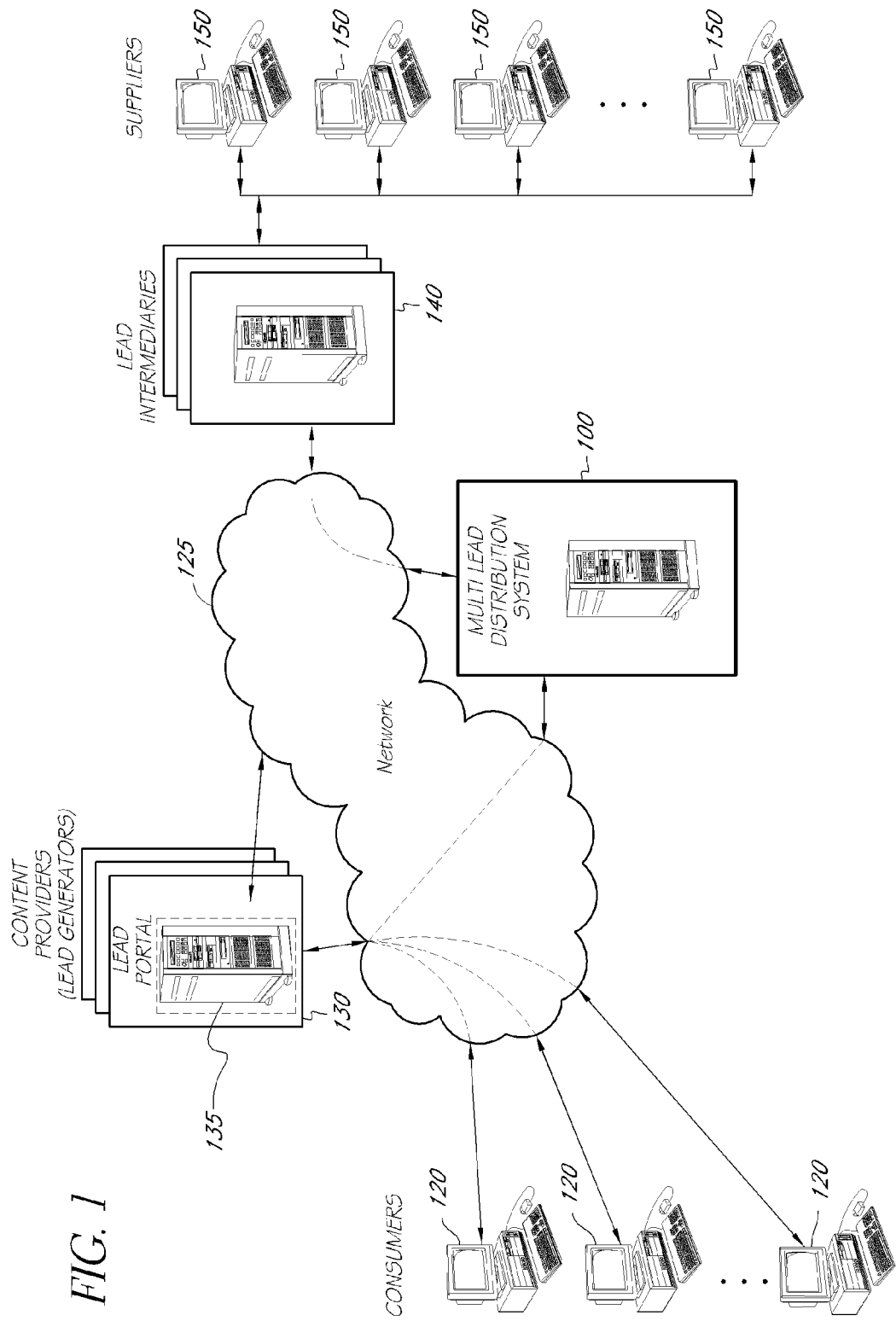
FIG. 1 is a block diagram that illustrates a general overview of one embodiment of a multi lead distribution system.

Exemplary embodiments of a system and method for distribution of leads or other commodities are described herein. FIG. 1 is a block diagram that illustrates a general overview of one embodiment of a multi lead distribution system engine (also referred to as a "system") 100. In general, the multi lead distribution system 100 purchases consumer leads obtained by a lead portal 135 and identifies a set of one or more candidate lead intermediaries 140 to whom to offer and ultimately sell or otherwise distribute the lead. The term "multi distribute" is used herein to refer to distribution of a lead or other commodity to a plurality of destinations and/or a plurality of times. The lead portal 135, also known as a lead source, generally obtains the lead, either directly or indirectly, from a consumer 120. The lead intermediary 140 in turn distributes the lead, either directly or indirectly by way of another lead intermediary 140, for use by a supplier 150 of goods and/or services of interest to the consumer 120.

As depicted in FIG. 1, consumers 120 may access, by way of a computer network 125, such as the Internet, one or more content providers 130 that serve as lead generators. Computer networks suitable for use with the embodiments of the multi lead distribution system 100 include local area networks (LANS), wide area networks (WANS), Internet, or other connection services and network variations, such as the World Wide Web, the public internet, a private internet, a private computer network, a secure internet, a private network, a public network, a value-added network, and the like. The computer connected to the network may be any microprocessor controlled device that permits access to the network 125, including terminal devices, such as personal computers, workstations, servers, mini computers, mainframe computers, laptop computers, mobile computers, palm top computers, hand held computers, cellular phones, personal digital assistants, set top box for a TV, or a combination thereof. The computers may further possess input devices such as a keyboard or a mouse, and output devices, such as a computer screen, a printer, or a speaker. The computer network may include one or more LANs, WANs, Internets, and computers. The computers may serve as servers, clients, or a combination thereof.

In preferred embodiments, the content providers 130 may be any of a variety of entities that make available to the consumers 120 one or more web pages that offer general and/or specialized information, services, links to other web pages, and the like.

In particular, with respect to embodiments of the multi lead distribution system 100 described herein, one or more of the content providers 130 offers one or more web pages that serve as a lead portal 135 through which a consumer 120 may request additional information about a product or service of interest and may provide contact information for receiving the information. The consumer 120 is thus assumed to be potentially interested in making a purchase.

In other embodiments, the content provider 130 may provide access to the lead portal 135 for consumers 120 using another communication technology, such as via a text messaging system or any other communications system.

The request for further information from the consumer 120, including the consumer's contact information, becomes a commodity known as a "lead," which may be of marketing value to suppliers 150 of the product or service of interest. The lead portal 135 may therefore be able to sell the lead for use by one or more such suppliers 150. As depicted in FIG. 1, the lead portal 135 may communicate about the lead with a multi lead distribution system 100 that purchases leads from lead portals 135 and that sells purchased leads to one or more lead intermediaries 140 for ultimate use by one or more suppliers 150 and/or sells leads directly to suppliers 150. In preferred embodiments, the multi lead distribution system 100 may communicate with the lead portal 135, and in some embodiments with the lead intermediaries 140, using any of a variety of known web service interfaces, such a one that uses a Simple Object Access Protocol (SOAP), which is an XML-based protocol In preferred embodiments, the lead portal 135 advantageously has a pre-established contractual relationship with the multi lead distribution system 100 that sets out, among other stipulations, conditions for the sale of leads by the lead portal 135 to the multi lead distribution system 100 and conditions for the re-sale of leads by the multi lead distribution system 100. For example, a price may be set to be paid by the multi lead distribution system 100 for leads received from the lead portal 135. The contractual relationship may specify whether the lead portal 135 allows the leads that it sells to be re-sold to more than one lead intermediary 140, and, if so, how many times and what prices must be paid to the lead portal 135. For example a lead portal 135 may allow each lead to be re-sold up to three times, and may ask to be paid $10 per each use of the lead. As another example, a lead portal 135 may allow each lead to be re-sold up to four times, and may demand different amounts to be paid for a first re-selling of a lead as compared to subsequent re-sellings of a lead, such as $12 for the first use of the lead and $8 each for the second, third, and fourth uses. As yet another example, the lead portal 135 may sell the lead for $13 and may allow the multi lead distribution system 100 to re-sell the lead multiple times at its discretion for no extra cost. The lead portal 135 may agree to a payment arrangement with the lead distribution system 100 that includes a cost discount once the multi lead distribution system 100 has purchased a given quantity of leads from the lead portal 135 within a given time period. Other such pricing agreements and business rules will be familiar to one of ordinary skill in the art and are contemplated as being implemented with embodiments of the multi lead distribution system 100 described herein.

In addition to matters of pricing and multiple re-sells, the contractual relationship may include business rules of the lead portal 135 that are to be carried out by the multi lead distribution system 100. The business rules may include information about relationships between the lead portal 135 and one or more of the lead intermediaries 140 and/or the suppliers 150. For example, the lead portal 135 may specify a list of the lead intermediaries 140 and/or suppliers 150 who should receive preference in receiving leads purchased from the lead portal 135, or to whom leads from the lead portal 135 may not be sold. The lead portal 135 may also inform the multi lead distribution system 100 of pricing agreements that the lead portal 135 has established with one or more of the lead intermediaries 140 and/or the suppliers 150.

As will be described in greater detail below, in preferred embodiments, the multi lead distribution system 100 is configured to very flexibly and easily accommodate modifications to its selection functions. Thus, in preferred embodiments, the multi lead distribution system 100 is configured to carry out business rules and agreements imported from a first lead portal 135 together with its own internal business rules and agreements when selecting candidate destinations for leads offered for purchase by the first lead portal 135, and, when selecting candidate destinations for leads offered for purchase by a second lead portal 135, to carry out business rules and agreements imported from the second lead portal 135 together with its own internal business rules and agreements. A table-driven selection system accesses in real-time a variety of values that represent the business rules and agreements of the lead portal, one or more candidate destinations, and the multi lead distribution system 100 itself in order to select an advantageous one or more destinations to receive the lead. In preferred embodiments, each selection determination is made using up-to-date decision factor values drawn dynamically from data values that may be advantageously modified at any time to reflect business agreements and/or to enhance system performance. In one embodiment, the multi lead distribution system 100 is configured to identify a proposed set of destinations for a lead within less than one-half second.

In preferred embodiments, the multi lead distribution system 100 also advantageously has pre-established contractual relationships with one or more lead intermediaries 140 that set out, among other stipulations, conditions for the purchase of leads by each of the lead intermediaries 140 from the multi lead distribution system 100. For example, each of the lead intermediaries may agree on a price to be paid for leads received from the multi lead distribution system 100. The contractual relationship may specify whether the lead intermediary 140 is willing to purchase leads that are also offered to one or more other lead intermediaries 140 and whether the lead intermediary 140 refuses to receive leads from any one or more lead portals 135 including lead portals 135 of specified quality levels. The contractual relationship may specify suppliers 150 to whom the lead intermediary 140 sells leads. Lead pricing structures and business rules in this area will be familiar to one of ordinary skill in the art and are contemplated as being implemented with embodiments of the multi lead distribution system 100 described herein. The multi lead distribution system 100 advantageously stores the business rules and preferences imported from the various lead intermediaries for use in distributing leads.

Communications between the multi lead distribution system 100 and some or all of the lead intermediaries 140 may take place via computer network, such as, for example the Internet or other public network. Additionally or alternatively, the multi lead distribution system 100 may communicate with some or all of the lead intermediaries 140 via an intranet or via a direct and/or dedicated computer communication connection. In some embodiments, as described below, the multi lead distribution system 100 and at least one lead intermediary 140 may be operated by a single business entity and may be implemented within a single computer system.

Before the multi lead distribution system 100 purchases a lead from the lead portal 135, the lead portal 135 may first advantageously provide the multi lead distribution system 100 with partial information about the lead, as will be described in greater detail with reference to FIG. 2A below. The multi lead distribution system 100, in turn, provides partial information about the lead to one or more lead intermediaries 140 and/or directly to one or more suppliers 150 in order to inquire if they are tentatively interested in purchasing the lead.

Advantageously, the multi lead distribution system 100, or other potential purchasers, are interested in purchasing leads that are known to be of interest to one or more lead intermediaries 140. A lead intermediary 140, in turn, is interested in purchasing leads that the lead intermediary 140 knows it can sell to one or more suppliers 150 and/or other intermediaries 140.

Suppliers 150, and other lead users may not always agree to purchase every lead offered to them. For example, suppliers 150 are typically not willing to purchase an unlimited amount of leads within a given time period, nor are they typically willing to purchase leads for products or services that they do not sell, or that are from geographical areas that they do not serve. For example, automobile suppliers 150 may not want to pay for leads for very popular vehicles, known as "high demand" vehicles which may be hard to keep in stock and which the supplier 150, in any event, knows will be easy to sell. For these and/or other reasons, suppliers 150 may not wish to purchase an offered lead.

Furthermore, suppliers 150 may enter into contractual agreements to purchase leads from one or more lead brokers, such as lead intermediaries 140 and/or from the lead distribution system 100. In some embodiments, lead intermediaries will purchase leads on behalf of suppliers 150 and other entities such as sales support services, may use the lead on behalf of the supplier 150.

Frequently, at least in part in order to avoid receiving more leads within a given time period, such as per month or per week, than the supplier 150 can adequately service, the supplier 150 enters into an agreement with the lead intermediary 140 or other provider of leads, to establish a maximum number of leads per given time period (referred to herein as a "cap", "target" or "run stop" amount) that the supplier 150 will agree to purchase from the lead intermediary 140, lead distribution system 100, or other provider of leads. In some embodiments, increments of the target amount known as a "run rate amount" may also be tracked. For example, a supplier 150 with a target amount of sixty leads may have a daily run rate of two leads that the supplier 150 wishes for the multi lead distribution system 100 to use to limit leads distributed to the supplier 150. A supplier 150 who contracts to purchase leads from more than one lead intermediary 140 may have a separate target amount with each lead intermediary 140. At a given instance, the supplier 150 may have met its target or run rate with a first lead intermediary 140 and thus be unwilling to accept additional leads from the first lead intermediary 140 during the time period, while still being willing to accept leads from a second lead intermediary 140, from whom the supplier 150 has not yet purchased its target amount or run rate amount of leads for the time period.

In some embodiments, before agreeing to purchase the lead from the lead portal 135, the multi lead distribution system 100 first communicates with the lead intermediaries 140 to confirm that an interest exists in buying the lead.

One example of an industry in which consumer leads are purchased by suppliers 150 is the automotive industry. Lead portals 135 for the automotive industry advantageously send an abbreviated notification, including partial information about a potential lead, which is known as a "ping." The ping may include, for example, only zip code information, or zip code and automotive make and model information, which suppliers 150 and intermediaries 140 may use to determine if they are interested in purchasing the lead. In other embodiments, the ping may also include information about an automobile's trim level that is of interest to the consumer 120, or other defining information. The consumer 120 contact information is not usually disclosed during the ping stage of the lead.

If interest on the part of one or more lead intermediaries 140 and/or suppliers 150 is confirmed, the multi lead distribution system 100 may then relay back to the lead portal 135 an interest in purchasing the lead. The lead portal 135 may then provide the actual lead, including full consumer contact information that may be used by one or more suppliers 150 to contact the consumer 120. Sending the lead with the consumer's full contact information is commonly known as "posting" the lead. In the case of a lead sent to the multi lead distribution system 100, once the lead portal 135 has posted, the multi lead distribution system 100 may then sell the lead one or more times, as desired and in accordance with contractual agreements that the multi lead distribution system 100 has with the lead portal 135, the lead intermediaries 140, and/or the suppliers 150.

If no interest on the part of one or more lead intermediaries 140 and/or suppliers 150 is indicated, at either the ping or the post stage, the multi lead distribution system 100 may decline the lead. If the multi lead distribution system 100 is able to identify suitable lead intermediaries 140 and/or suppliers 150 for only a portion of the available distributions of the lead, the multi lead distribution system 100 may indicate to the lead portal 135 an interest in purchasing only the portion of the available placements.

In some embodiments, the lead portal 135 may not first ping the multi lead distribution system 100, and instead directly posts the lead to the multi lead distribution system 100 with full consumer contact information when offering the lead for sale to the multi lead distribution system 100.

In FIG. 1, the lead portals 135, the lead intermediaries 140, and the multi lead distribution system 100 are depicted as three separate entities that may communicate with one another via computer network 125. In other embodiments, however, one or more of the lead portals 135, the lead intermediaries 140, and the multi lead distribution system 100 may be affiliated with one another under a joint corporate umbrella and may even share a common physical location. Functions of the lead portals 135, the lead intermediaries 140, and/or the multi lead distribution system 100 may advantageously be carried out by a single business entity. The multi lead distribution system disclosed herein may advantageously be easily adjusted to allow for a wide variety of such business configurations, in which some sales are viewed as "retail" while others are "wholesale", and the system 100 advantageously manages relationships with all.

For example, a single business entity may operate both a lead portal 135 and a lead intermediary 140 for one or more suppliers 150. One example of such an entity is an automobile manufacturer that maintains a website for providing information about the automobiles that it manufactures and that also accepts requests for additional information, such as questions about vehicle availability or price quotes, received from consumers 120 using the website. The manufacturer may forward to one or more of its affiliated dealers/suppliers the contact information and questions of the consumer 120 as a lead.

Another example of an entity that may operate both a lead portal 135 and a lead intermediary 140 is an automobile informational web service, such as the website operated by Kelley Blue Book, or the website operated by Edmunds.

A business entity that operates both a lead portal 135 and a lead intermediary 140 may send all of the leads received by its lead portal 135 to its lead intermediary 140, but may purchase additional leads from the multi lead distribution system 100 for re-sale by its lead intermediary 140. In other instances, rather than "sending" the lead to its lead intermediary 140 portion, the entity may be configured to operate as a lead intermediary 140 itself and may therefore send some or all of its leads directly to one or more suppliers 150.

A business entity that operates both a lead portal 135 and a lead intermediary 140 may choose to sell at least a portion of the leads that it receives through its lead portal 135 to the multi lead distribution system 100 for any of a variety of business reasons. For example, the lead intermediary 140 portion of the entity may be configured to sell each lead to only a single supplier 150 and the entity may earn more by selling the lead to the multi lead distribution system 100 for distribution to several suppliers 150. As another example, the lead portal 135 portion of the entity may offer a lead to the multi-lead distribution system 100 when the lead intermediary 140 portion of the entity does not have a buyer for the lead. As was described above, a supplier 150 who has reached its target amount of leads may not be willing to purchase additional leads from the corporate entity's lead intermediary 140, while being willing to purchase leads through another lead intermediary 140 who may receive leads from the multi lead distribution system 100.

Additionally or alternatively, the business entity may be configured to sell its leads to more than one supplier 150, but may not be configured to intelligently and efficiently identify a set of suppliers 150 to whom to sell each lead so that revenue and/or other business benefits from the lead are maximized. In such cases, although the multi lead distribution system 100 may be permitted to sell the lead to a lead intermediary 140 other than the lead intermediary operated by the business entity, the contractual agreement between the multi lead distribution system 100 and the lead portal 135 of the business entity may stipulate that the lead intermediary 140 portion of the entity should receive leads from the lead portal 135 preferentially over other lead intermediaries 140. For example, an affiliated and preferred lead intermediary 140 may more frequently be offered leads from lead portals known to be of high quality, as will be described in greater detail with reference to FIGS. 8A-8F and FIG. 9. As another example, the multi lead distribution system 100 may route some leads to affiliated lead intermediaries 140 even if other non-affiliated lead intermediaries are willing to pay more for the lead. Alternatively, the contractual agreement with the multi lead system 100 may stipulate that the lead portal 135 will sell the lead directly to its own affiliated lead intermediary 140 and that, in addition, the multi lead distribution system 100 may sell the lead only to other lead intermediaries 140.

As another example of how the lead portals 135, the lead intermediaries 140, and the multi lead distribution system 100 may be affiliated, the multi lead distribution system 100 may be operated by an entity that also operates one or more lead intermediaries 140. In such cases, the affiliated lead intermediaries 140 will advantageously frequently receive preferential treatment in receiving leads from the multi lead distribution system 100, as will be described in greater detail with reference to revenue scoring below. Furthermore, in some embodiments of such cases, the one or more affiliated lead intermediaries 140 may be co-located with the multi lead distribution system 100 or may be otherwise in direct communication with the multi lead distribution system 100, such as via an intranet or other internally operated network or file system. Additionally or alternatively, in some embodiments of such cases, the multi lead distribution system 100 has access to information about one or more suppliers 150 available from the affiliated lead intermediaries that may not be available from other non-affiliated lead intermediaries. For example, the multi lead distribution system 100 may have access to lead target information regarding one or more suppliers 150 with respect to an affiliated lead intermediary, but not with reference to unaffiliated lead intermediaries. Thus, the multi lead distribution system 100 may be able to identify suppliers who have reached their target amount of leads purchased from an affiliated lead intermediary 140, but not be able to perform the same identification for other non-affiliated lead intermediaries. As discussed further with reference to FIGS. 8A-8F, embodiments of the multi lead distribution system 100 are advantageously configured to use the additional information about the suppliers 150, when the information is available, in selecting suppliers to whom to offer the leads it receives from the lead portal 135, and to select suppliers to whom to offer the leads without benefit of the additional information when the information is not available. Furthermore, when the multi lead distribution system 100 is closely affiliated with one or more lead intermediaries 140, the combined multi lead distribution system 100/lead intermediary 140 may distribute leads directly to at least some of the suppliers 150.

Additionally, although the environment depicted in FIG. 1 includes only lead portals 135 that receive information about leads directly from consumers 120, in other embodiments, the information about leads may pass from the consumer 120 to a first lead portal 135 and then to another, or through one or more other lead aggregators or other types of entities, before being transmitted to the multi lead distribution system 100.

The environment depicted in FIG. 1 similarly includes only lead intermediaries 140 who are in direct contact with the suppliers 150. In other embodiments, the multi lead distribution system 100 may sell or otherwise transfer leads to lead intermediaries 140 (lead brokers) who in turn transfer the leads to other lead intermediaries 140 before the leads reach the suppliers 150, or other end users of the leads.

Although the suppliers 150 in FIG. 1 have been described as entities that both offer the goods or services of interest to the consumer 120 and as entities that contact the consumers 120 in response to the leads, in other embodiments, another entity, such as a separate marketing service for the supplier 150, may receive the leads from the lead intermediaries 140 and may contact the consumers 120 on behalf of the suppliers 150.

As depicted in FIG. 1, the multi lead distribution system 100 may receive leads from more than one lead portal 135, each one receiving leads from a large number of consumers 120. Typically, each individual lead is associated with a single lead portal 135.

In some embodiments, a lead portal 135 may establish more than one contractual relationship with the multi lead distribution system 100. For example, the lead portal 135 may sell leads from different parts of its system (for example, from its homepage, from its consumer automobile section, from its shopping information page) to the multi lead distribution system 100 according to different pricing structures. The different contractual relationships may be distinguished from one another in dealings between the lead portal 135 and the multi lead distribution system 100 by the use of different identification numbers for the various contractual relationships. Similarly, intermediaries 140 may operate different "programs", or different aspects of an intermediary 140 may be identified by the multi lead distribution system 100 as more than one intermediary program, each with its own imported set of business rules for applying the selection and blocking routines of the multi lead distribution system 100.

Although FIG. 1 includes only a single multi lead distribution system 100, in other embodiments, more than one multi lead distribution system 100 may be present, operating independently, cooperatively, or a combination of the two.

Furthermore, throughout the present disclosure, embodiments of the multi lead distribution system 100 are described with reference to the distribution of leads regarding automobile purchases. As will be understood by one of ordinary skill in the art in light of the present disclosure, the system 100 may also be used for distributing and/or multi-distributing any of a variety of other leads, including, but not limited to, other types of sales, requests for information about various commodities, such as loans or insurance, and other business leads. In other embodiments, the system 100 may be used to multi-distribute other commodities, such as advertising space for real-time presentation on web pages or other electronic media.

Figure 2A:
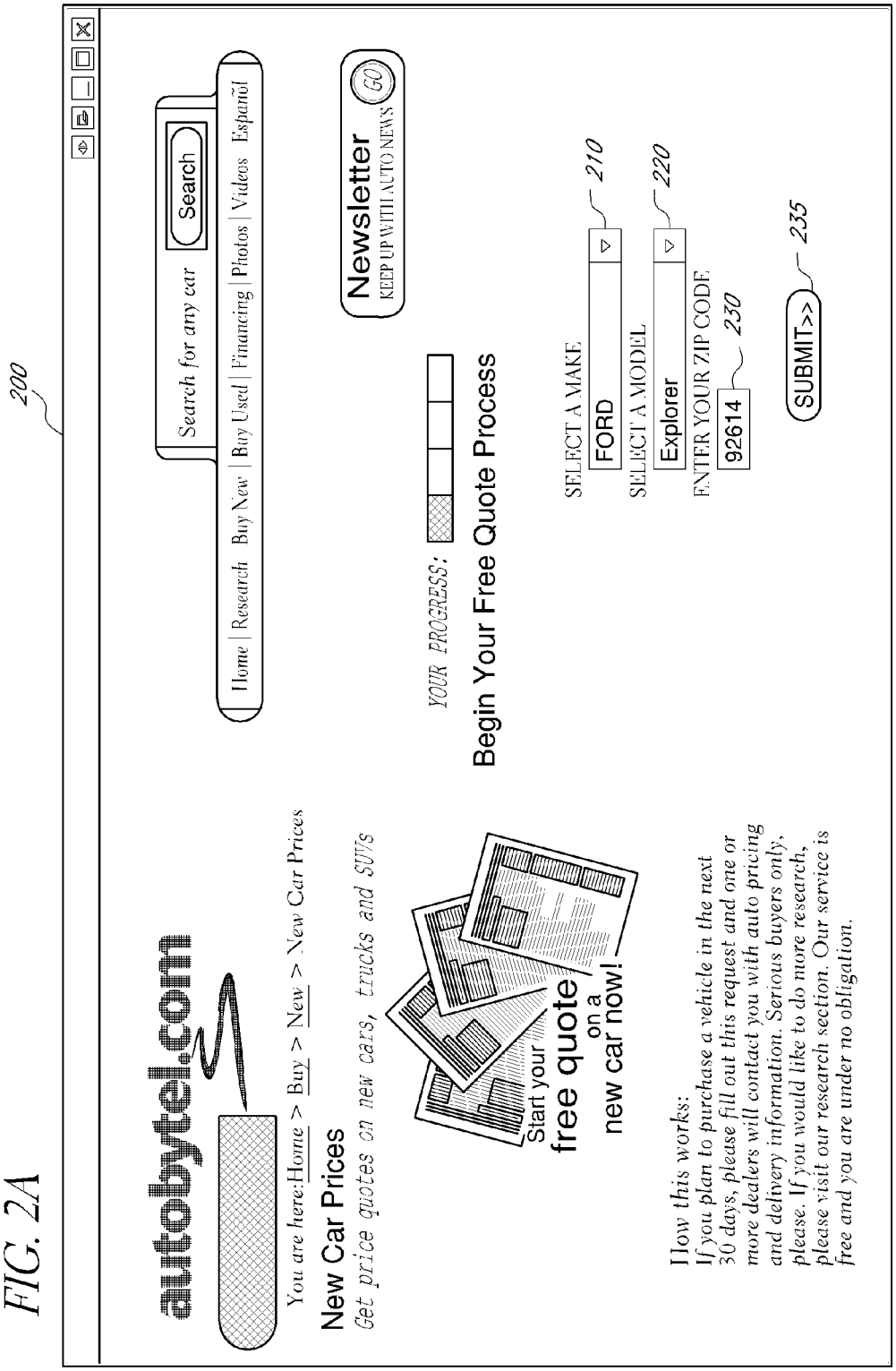
FIG. 2A depicts one embodiment of a preliminary lead submission form.

FIG. 2A depicts one embodiment of a preliminary lead submission form 200. Embodiments of the preliminary lead submission form 200 may be presented as a web page by a lead portal 135 for enabling a consumer 120 to request additional information about one or more products and/or services. The preliminary lead submission form 200 depicted in FIG. 2A is intended for use by consumers who express an interest in to purchasing a vehicle. The form 200 asks the consumers 120 to provide information about their request and informs them that one or more dealers will contact them with auto pricing and delivery information. As was described with reference to FIG. 1, in some embodiments, the lead portal 135 may first provide the multi lead distribution system 100 with partial information about the lead in order to determine whether the multi lead distribution system 100 has any interest in purchasing the lead. The sample preliminary lead submission form 200 of FIG. 2A accepts preliminary information from the consumer 120 which the lead portal 135 receives once the consumer clicks the submit button 235 or otherwise indicates a desire to submit a request for additional information. The lead portal 135 may then transmit to the multi lead distribution system 100 a ping (a notification of a potential lead), which may, in some embodiments, be transmitted to the multi lead distribution system 100 in the form of a data packet, wireless transmission, or other signal. If the multi lead distribution system 100 responds with acceptance of the lead, the lead information (post) may similarly in some embodiments, be transmitted to the multi lead distribution system 100 in the form of a data packet, wireless transmission, or other signal.

In this example, the lead portal 135 advantageously collects leads from consumers 120 who may be interested in purchasing an automobile. For this the purpose, the sample preliminary lead submission form 200 provides one or more drop-down menus or other user input technology for accepting information from the consumer 120 regarding an automobile make 210 and model 220. The preliminary lead submission form 200 also provides user input technology for accepting the consumer's zip code 230. For the automobile industry, providing information about a make, model, and zip code of interest may allow lead intermediaries 140 and/or suppliers 150 to determine if a potential lead is of interest, while allowing the consumer 120 to remain anonymous before purchase of the lead by the multi lead distribution system 100.

In some embodiments, the lead portal 135 may accept other types of information from the consumer 120 for inclusion with the preliminary lead submission. For example, for auto industry leads, the lead portal 135 may accept information about desired accessory and trim levels from the consumer 120.

As will be familiar to practitioners skilled in the art, preliminary lead submission forms 200 for other industries, such as for cell phone plans, real estate purchases, online banner advertising fresh flower purchases, automobile financing, real estate mortgages, credit card inquiries, and the like, may accept other types of information from the consumer 120 as relevant to their industries. Furthermore, preliminary lead submission forms 200 for some industries that are not location-dependent, such as for mail order sales or internet-based sales like eBay, for example, may not request zip code information 230 from the consumer 120.

In some embodiments, the preliminary lead submission form 200 may be presented to the consumer 120 as more than one web page that accepts information before submission of the partial information to the multi lead distribution system 100.

Figure 2B:
FIG. 2B depicts one embodiment of a full lead submission form with a list of candidate suppliers to receive the lead.

FIG. 2B depicts one embodiment of a full lead submission form 240. Embodiments of the full lead submission form 240 may be displayed as a web page by the lead portal 135 to the consumer 120 in response to submission of the preliminary lead submission form 200.

In the embodiment shown in FIG. 2B, the full lead submission form 240 includes a list of candidate suppliers 260, selected by the multi lead distribution system 100, who are potentially interested in receiving the lead. In the case of an automobile lead distribution system, the candidate suppliers 260 may be automobile dealerships. The full lead submission form 240 may include, for each candidate supplier 260, radio buttons 270 or another input technology for allowing the consumer to indicate whether the consumer 120 wishes the lead information to be provided to that candidate supplier 260. In preferred embodiments, default settings of the radio buttons 270 indicate that the consumer's contact information 250 will be provided to all of the candidate suppliers 260, and the consumer 120 may override the default for one or more candidate suppliers 260, if desired, by clicking the appropriate buttons 270.

In some embodiments, buttons 270 are provided to allow the consumer 120 to indicate dealers 260 that the consumer 120 does not want to receive the contact information, but in the absence of such indication, the contact information is sent to all the dealers on the candidate dealer list 260.

For online environments, the sample full lead submission form 240 of FIG. 2B is preferably displayed for the consumer 120 by the lead portal 135 in less than one second, or only a very few seconds, from the time that the preliminary lead submission form 200 was submitted. In order to submit the full lead, the consumer 120 enters contact information 250 that allows one or more suppliers 150 to contact the consumer 120 regarding the product or service of interest.

In the sample full lead submission form 240 depicted in FIG. 2B, the consumer 120 is also prompted to enter additional information 280, including information about preferred contact times, intended time frame for purchase, comments, and permission to use the contact information for purposes other than soliciting information about the desired products and/or services. In some other embodiments, no additional information 280 is requested of the consumer 120. In still other embodiments, other types of additional information 280 may be additionally or alternatively requested from the consumer 120. Once the consumer 120 presses a submit button 290, or otherwise indicates a desire to submit the information, the lead portal 135 submits some or all of the information from the full lead submission form 240 to the multi lead distribution system 100.

In the embodiment depicted in FIG. 2B, the consumers 120 are informed that their information will be sent to the indicated dealers and that one or more of the dealers will contact them with further information. In other embodiments, the consumer 150 is informed that their contact information will be provided to one or more dealers who can provide the consumer with the desired product information, but no list of dealer names 260 is provided to the consumer or, in some embodiments, to the lead portal 135

In some embodiments, the multi lead distribution system 100 may use the consumer contact information 250 for additional uses other than the lead in question, unless such additional use is prohibited by agreements with the lead portal 135 or unless permission is denied by the consumer 100. Such additional use of consumers contact information, including for example the inclusion of the information on mailing lists that may be sold, may provide additional revenue to the multi lead distribution system 100 and may accordingly make lead portals 135 that allow such additional use more attractive as business partners to the multi lead distribution system 100. As will be described in greater detail with reference to FIG. 9 below, the multi lead distribution system 100 advantageously includes control mechanisms that allow for inclusion of additional business considerations in the assessment of the desirability of purchasing a lead from a lead portal 135.

Figure 3A:
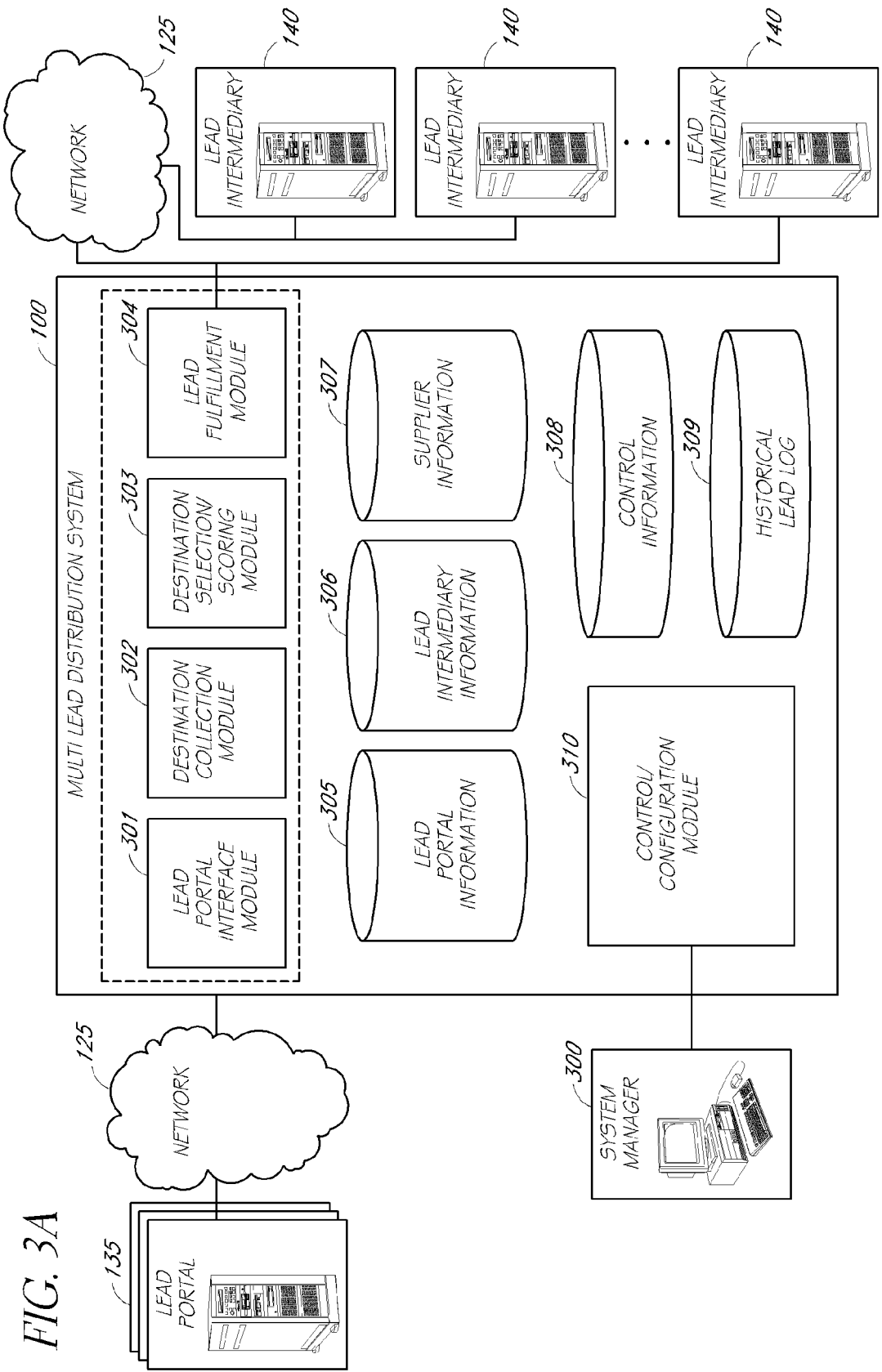
FIG. 3A is a block diagram that illustrates in greater detail one embodiment of a multi lead distribution system.

FIG. 3A is a block diagram that illustrates in greater detail one embodiment of a multi lead distribution system 100. The multi lead distribution system 100 is a processing engine that may be implemented as one or more computer processors configured to access a set of computer processor instructions stored on a processor-readable medium. The computer processor instructions instruct the processors to take actions, including accessing various processor-readable data repositories 305, 306, 307, 308, 309 stored on processor-readable medium, to carry out the functions described herein. Instructions refer to computer-implemented steps for processing information in the multi lead distribution system. Instructions can be implemented in software, firmware or hardware and include any type of programmed step undertaken by modules of the multi lead distribution system.

The multi lead distribution system 100 includes various modules as discussed in detail below. The modules may advantageously be implemented as one or more computer program modules configured to reside on an addressable storage medium operably connected to one or more microprocessors. The modules may be advantageously configured to execute on the one or more microprocessors. As can be appreciated by one of ordinary skill in the art, each of the modules may comprise various sub-routines, procedures, definitional statements, and/or macros. The modules are not typically separately compiled (although in some cases they may be), and, generally, the modules form part of a single executable program. Therefore, the following description of each of the modules is used for convenience to describe the functionality of the multi lead distribution system. Thus, the processes that are undertaken by each of the modules may be variously redistributed to one or the other modules, combined together in a single module, or made available in, for example, a shareable, dynamic link library.

The one or more microprocessors may be any conventional general purpose uniprocessor or multiprocessor operably connected to an addressable storage medium, such as random access memory, and may be further operably connected to a non-volatile storage medium, such as a magnetic or an optical disk.

As was described with reference to the embodiment depicted in FIG. 1, the multi lead distribution system 100 receives information about new leads via the computer network 125 from the lead portal 135. As was also described with reference to the embodiment depicted in FIG. 1, the multi lead distribution system 100 communicates via the network 125 with a plurality of lead intermediaries 140 that may be interested in purchasing the lead.

The multi lead distribution system 100 determines, for each incoming lead, a preferred set of one or more lead intermediaries 140 and/or suppliers 150 to whom the multi lead distribution system 100 offers the full lead. In preferred embodiments, the multi lead distribution system 100 uses internal logic, as will be described in greater detail below, such as with reference to FIGS. 8A-8F, to derive a desirably increased profit from sale(s) of the lead, while also desirably increasing other business benefits and conforming to business agreements with the lead portal 135, the lead intermediaries 140 and/or with the suppliers 150.

As depicted in FIG. 3A, embodiments of the multi lead distribution system 100 advantageously include processor-readable storage medium configured as several types of data repositories 305, 306, 307, 308, 309 on which the calculations and determinations of the multi lead distributions system 100 are based, at least in part. In one preferred embodiment, the data repositories 305, 306, 307, 308, 309 are advantageously configured as relational databases that allow for very efficient manipulation of data representing various complex relationships associated with the multi lead distribution system 100. In other embodiments, the data may be stored using other types of advantageous data persistence systems.

The multi lead distribution system 100 includes a repository of lead portal information 305 that stores data about the lead portals 135 (also known as lead sources) from which the multi lead distribution system 100 accepts leads. Information about each lead portal 135 may include, but is not limited to: information related to one or more prices charged by the lead portal 135 for the leads it routes to the multi lead distribution system, information about whether the lead portal allows for multiple re-selling of the leads it offers, and if so, any limits on the number of times its leads may be multi-sold, information about a preferred maximum distance of suppliers receiving the lead information from a consumer's zip code or other consumer location information provided, information about lead intermediaries 140 to which the lead portal does not want its leads sold, lead intermediaries 140 that the lead portal wishes to have preferential access to its leads, and the like.

In preferred embodiments, one or more cost scores are associated with the lead portal 135 and may be stored in the repository of lead portal information 305. The cost scores may be based on actual costs of purchasing leads from the lead portal 135 and may be modified by a control/configuration module 310 according to other business considerations associated with the lead portal 135, such as special business affiliations, price breaks, or quantity bonuses offered by the lead portal 135. Thus, two lead portals 135 having the same cost score may, in fact, charge different amounts for their leads. Modifications due to business considerations may cause the two to be assigned the same cost score. In some embodiments, one of the lead portals 135 may even be owned by the same entity as owns the multi lead distribution system 100 and there may be no actual monetary cost associated with obtaining leads from the lead portal 135.

As will be described in greater detail with reference to FIGS. 8A-8F below, cost scores are used in selecting one or more destinations for an incoming lead. Modifying a cost score to be higher than the actual cost paid for a lead may indicate that doing business with the lead portal 135 is somehow less desirable and involves other perceived business "costs" beyond an actual monetary amount paid for the lead. Conversely, for a lead portal 135 that allows its lead contact information to be re-sold by the multi lead distribution system 100 for other non-lead purposes, the cost score may be modified downward from the actual cost to reflect that additional income from the lead information may offset some of the actual cost of the lead.

As another example, a lead portal 135 and the multi lead distribution system 100 may be owned by the same entity or may be otherwise specially affiliated, and a cost score assigned to the lead portal 135 may accordingly be adjust downward to aid in distribution of leads from the lead portal 135. As yet another example, the control/configuration module 310 may be configured to automatically lower the cost score of a lead portal 135 that has newly registered to sell leads through the multi lead distribution system 100 for an introductory period of time in order to increase sales of leads from the lead portal 135 and in order to provide a positive business experience for the lead portal 135. The control/configuration module 310 may be configured to detect how many leads have been purchased from the lead portal 135 within a given time period. If a business agreement with the lead portal 135 specifies that the lead portal 135 will provide a bonus to the lead distribution system 100 once the lead distribution system 100 has purchased a threshold number of leads, the control/configuration module 310 may automatically modify one or more cost scores associated with the lead portal 135 as that threshold number of leads approaches.

In general, elevating a lead portal's cost score will tend to slow down or diminish the sale of its leads, as the system 100 will find fewer profitable buyers for the leads. Conversely, lowering a lead portal's cost score will make identification of a transaction perceived as profitable easier.

These and other modifications to the cost score and to other types of scores described herein will be understood by one of ordinary skill in the art in light of the present disclosure and are contemplated as being within the scope of the present disclosure.

The multi lead distribution system 100 also includes a repository of lead intermediary information 306 that stores data about the lead intermediaries 140 to which the multi lead distribution system 100 sells leads. Information about each lead intermediary 140 may include, some or all of: information related to one or more actual prices paid by the lead intermediary 140 for the leads it buys from the multi lead distribution system, one or more associated revenue scores relative to the lead intermediary 140, information about suppliers 150 to whom the lead intermediary 140 sell leads, information about whether the lead intermediary has any limits on the lead portals 135 from which the lead intermediary will accept leads, information about whether the lead intermediary accepts only exclusive leads or whether it is willing to accept leads that are also sold to other lead intermediaries and/or suppliers 150, and the like. In some embodiments, additional information about the lead intermediary may also be stored in the lead intermediary repository 306.

In some embodiments, the multi lead distribution system 100 further includes a repository of supplier information 374 that includes information about some or all of the suppliers 150 to whom leads from the multi lead distribution system 100 are sold. The information may include information such as: location information about the supplier, types of products sold by the supplier, lead intermediaries from whom the supplier buys leads, and the like.

FIG. 9 below depicts one embodiment of a screen shot of a form 900 that provides a view to information from the repository of lead portal information 305, the repository of lead intermediary information 306, and the repository of supplier information 374. In some embodiments, the form 900 may be used by a control/configuration module 310 to enter and/or to modify data in the repositories 305, 306, 374 and to thereby modify system behavior.

A repository of historical lead transaction information 309 stores information about leads that have been purchased and/or sold by the multi lead distribution system 100 including data values used for selecting lead recipients. The information may be used to assist in accounting functions such as, for example, tracking sales of leads, progress towards target sales goals, accounting of monies owed to the lead portals 135 for the purchase of leads, and monies owed by the lead intermediaries 140 for leads received from the multi lead distribution system 100. The information may also be advantageously used for assessing the performance and/or profitability of the multi lead distribution system 100, of the lead portals 135 and/or of the lead intermediaries 140. For example, data in the historical lead log 309 allows the system manager 300 to review past distribution decisions and to carry out 'what-if' type simulations that allow performance of the multi lead distribution system 100 to be advantageously modified and enhanced, when applicable.

The control/configuration module 310 may set and re-set various system factors, such as one or more simulated cost scores, revenue scores, lead portal quality assignments, number of sellings allowed per lead, or the like, to hypothetical levels and to "replay" the system's lead distribution activities of a previous time period, in order to assess the effect of such modifications upon the overall profitability and/or measure of system 100 performance. Based on such assessment, the control/configuration module 310 may set future system data values used to carry out future lead distributions, resulting in better business benefit going forward.

The historical lead log 309 may also be used to examine and understand past performance. For example, if a given lead portal allows the multi lead distribution system 100 to route each lead four different times, but data in the historical lead log 309 indicates that usually only two placements per lead are found for leads from the lead portal 135, the record in the log may be examined in order to understand the cause of the system's 100 behavior. In various embodiments, the control/configuration module 310 may be configured to regularly review system performance, at any of a variety of advantageous time spans, both short and long. For example, the control/configuration module 310 may be configured to "replay" and review system performance every six to twelve months, or do a random simulation/modification of one week's performance every month, or review system performance during the busiest and the quietest hours at the end of each day. The selected time period to be reviewed may be similarly of different durations, such as from thirty to five hundred seconds, or from half-an-hour up to twelve hours, or one day to one week, or any of a variety of other advantageous time ranges. Additionally or alternatively, the control/configuration module 310 may be configured to simulate the effect of proposed special programs, such as rebates, quantity discounts, higher pricing for higher quality leads that may be contemplated as being offered or being modified by the lead distribution system 100 in the future. As will be clear to one of ordinary skill in the art in light of the present disclosure, the system 100 provides for a wide range of analysis opportunity. Furthermore, in some embodiments, an automated trigger, such as a timer or calendar reminder system, or a module configured to recognize specific patterns in the lead log records, instructs the control/configuration module 310 to automatically modify one or more quality grades or scores or other data variables, as indicated by an analysis of simulation exercise, thereby affecting subsequent calculations and potentially affecting selection of candidate recipients of the business leads.

The multi lead distribution system 100 further includes a repository of control information 308. The repository of control information 308 may include information entered into the system 100 using a control/configuration module 310 that modifies the values of data in the repositories 305, 306, 307, 308, 309 and thereby affects the results of various functions performed on data by a lead portal interface module 301, a destination collection module 302, a destination selection/scoring module 303, and a lead fulfillment module 304 of the multi lead distribution system 100. In some embodiments, scores, quality ranking assignments, and the like, may be stored in the control information repository 308.

The lead portal interface module 301 communicates with the lead portals 135. The lead portal interface module 301 accepts information from the lead portal 135, both in the form of partial lead information (a 'ping') and in the form of full lead information (a 'post'). The lead portal interface module 301 may transmit to the lead portal 135, in response to a ping, information about a candidate set of suppliers 260 to whom a lead may be sent. The lead portal interface module 301 may transmit information indicative of an interest in purchasing the lead without an indication of which suppliers 150 will receive the consumer's 120 contact information.

Once a lead is posted, and the lead has been accepted for purchase by one or more lead intermediaries 140 and/or suppliers 150, the lead portal interface module 301 may also transmit to the lead portal 135 and/or directly to the consumer 120 an acknowledgement of the post. In some embodiments, the acknowledgement may include information about a set of intermediaries 140 and/or suppliers 150 to whom the lead was sent.

In some embodiments, the lead portal interface module 301 performs one or more validation processes on incoming pings and posts in order to advantageously eliminate pings and posts that are suspected of being fraudulent. Various methods of validation known to practitioners of skill in the leads industry may be used by the lead portal interface module 301. For example, when consumer names are included, pings and posts that include names of famous persons, literary characters, obscene words, or the like, may be rejected by the lead portal interface module 301. Similarly, pings and posts that include non-existent zip codes may be rejected by the lead portal interface module 301. When possible, leads that are duplicative of previously received leads may also be eliminated.

Once the lead portal interface module 301 has validated the incoming ping or post, a destination collection module 302 identifies an initial set of potential lead intermediaries 140 who may be interested in purchasing the associated lead. In one embodiment, the destination collection module 302 identifies the initial set of potential lead intermediaries 140 by instructing the lead fulfillment module 304 to send the ping information to all or some of the intermediaries 140 to inquire which of them are interested in purchasing the lead as identified by the ping information. Information about lead intermediaries 140 that respond affirmatively to the inquiry is returned to the destination collection module 302 and is used to form an initial set of potential lead intermediaries 140 for the lead.

In one embodiment, the destination collection module 302 forms the initial set of potential lead intermediaries 140 for the lead by accessing stored information in the repository of lead intermediary information 306 and/or in the repository of supplier information 307 to identify suppliers 150 and/or lead intermediaries 140 who may be interested in the lead, based on the ping information received from the lead portal 135. The destination collection module 302 instructs the lead fulfillment module 304 to send the ping information to all or some of the intermediaries 140 identified by the destination collection module 302 to inquire which of them are interested in purchasing the lead as identified by the ping information.

In some embodiments, the destination collection module 302 identifies the initial set of potential lead intermediaries 140 to whom to send the lead ping by a combination of the above-described methods, namely, by a combination of identifying suppliers 150 and/or lead intermediaries 140 who may have interest in the lead based on the ping information and information in one or more of the data repositories 307, 306, 305 and/or by sending out a blanket set of pings to a set of intermediaries 140 without specific knowledge of their potential interest in the ping.

Once the destination collection module 302 receives back responses to the initial set of pings sent out by the lead fulfillment module 304, the destination collection module 302 collects information about those lead intermediaries 140 and/or suppliers 150 that responded positively to the lead ping.

In preferred embodiments, lead intermediaries 140 that respond positively to the lead ping also provide a list of suppliers 150 to whom they are potentially interested in selling the lead. Because suppliers 150 may have relationships established to purchase leads from more than one lead intermediary 140, it is possible that two or more lead intermediaries 140 expressing interest in a lead may intend to sell the lead to the same supplier 150. By receiving information from the lead intermediaries 140 about the supplier(s) 150 to whom they intend to sell the lead, the multi lead distribution system 100 may advantageously avoid selling the same lead twice for the same supplier, and may be able, as described below, to identify a most profitable, or otherwise advantageous, lead intermediary 140 to use for selling a given lead to a given supplier 150. Accordingly, the system 100 may advantageously view the pairing of a lead intermediary and a supplier as a "destination pairing" for a given lead, to be compared with other potential "destination pairings" in determining how best to sell the lead. For purposes of the present disclosure, destination pairings may alternatively be referred to as "destinations" or "intermediary/supplier pairings" or the like. Additionally, some intermediaries 140 may not share information about the suppliers 150 to whom they sell their leads. In some embodiments, the system 100 may sell leads to these intermediaries 140 only if no other eligible destination pairings are available, or may otherwise modify one or more decision factor values to treat such intermediaries with less preference. For purposes of the present disclosure, however, the terms "destination," "destination pairing," "intermediary/supplier" and the like may refer to such intermediaries where the supplier is unknown.

The destination collection module 302 provides the collected information to a destination selection/scoring module 303 that advantageously identifies a preferred set of lead intermediary/supplier pairs (destinations) to whom to sell the lead from amongst the set who responded positively to the ping. In preferred embodiments, the destination selection/scoring module 303 applies a set of filtering operations and logical resolution on data values for the collected set and then scores the remaining sets of lead intermediaries 140 that are potentially interested in the lead and the suppliers 150 to whom they would like to sell the lead. The scoring is advantageously based, at least in part, on a set of margin scores that are calculated as the differences between one or more cost scores assigned to the lead portal 135 and on a revenue score assigned each of the potential lead intermediaries 140 for the lead. In some embodiments, the scoring and filtering occur substantially simultaneously. The scoring and selection processes of the selection/scoring module 303 are described in greater detail with reference to FIGS. 8A-8F.

Once a set of one or more lead intermediary/supplier pairings have been selected for receiving a lead, and once the lead information arrives from the lead portal 135, the lead fulfillment module 304 sends the lead contact information to the selected intermediaries 140 and/or suppliers 150.

The lead may be sent as an email, fax, text message or other computer-transmitted communication.

The cost scores assigned to the lead portal 135 generating the lead are based, at least in part, on one or more contracted costs that the multi lead distribution system 100 has agreed to pay for leads purchased from the lead portal 135. As has been described above, the lead portal's cost score may be modified, automatically or by the system manager 300, from its original cost value, based on one or more business considerations that may alter the system's 100 perceived "cost" of doing business with the lead portal 135.

The revenue score assigned to each of the lead intermediaries 140 potentially interested in purchasing the lead is based, at least in part, on one or more contracted amounts that the lead intermediary 140 has agreed to pay for leads purchased from the multi lead distribution system 100. As will be described in greater detail below, the lead intermediary's revenue score may be modified from its original purchase price value by the system manager 300, based on one or more business considerations that may alter the system's 100 perceived gain from selling a lead to the lead intermediary 140.

As described above, for each time that a lead may be sold, the margin score is calculated as:

$$\text{margin score} = (\text{revenue score}_{intermediary} - \text{cost score}_{portal})$$

Because the cost scores and the revenue scores are based in part on business considerations, the margin score, too, is based on both a potential monetary profit (or loss) generated by the purchase and sale of the lead, as well as on other business considerations that may not be associated with immediate monetary profit from the sale of the lead. Thus, the margin score represents a measure of perceived "business benefit" from the transaction, which includes both immediate monetary profit and, as assessed by the system manager 300, other perceived benefit based on business considerations.

In a preferred embodiment, a generalized definition of the task of the destination selection/scoring module 303 is to identify the set of intermediaries 140 to whom selling the lead will maximize the margin scores.

In some embodiments, a default value for the cost score is an actual cost charged by the lead portal 135 for the lead. Thus, if the lead portal 135 charges $10.50 for the leads that it provides, then "10.5" may be a default value for the cost score for the lead portal 135. If a lead portal 135 allows for multiple re-sales of the leads that it provides, and charges a different amount for each use of the lead, then a different cost score may be assigned for each purchase of the lead. For example, if $12 is charged for a first use of the lead, and $8 is charged for subsequent uses of the lead, up to a maximum of four total uses of the lead, then default cost scores of "12,"

"8", "8", and "8" may be assigned to the four possible uses of the lead. In other embodiments, the default value for the cost score is exactly or approximately proportional to the actual cost rather than being equal to the cost. Thus, the default cost scores for the example given above may be "120", "80", "80" and "80."

Information about the default cost scores assigned to the lead portals 135 may be advantageously stored in the lead portal information repository 305.

Once one or more default cost scores have been initially assigned to the lead portal 135 based on actual costs for purchasing leads from the lead portal 135, other business considerations may be used to modify the cost score, as will be described in more detail below, with reference to a control/configuration module 310 that may be accessed by a system manager 300.

In some embodiments, a default value for the revenue score initially assigned to a lead intermediary 140 is an actual amount paid by the lead intermediary 140 for the lead. Thus, if the lead intermediary 140 pays $20 for the leads that it purchases from the multi lead distribution system 100, then "20" may be an initial default value for the revenue score for the lead intermediary 140. In other embodiments, the initial default value for the revenue score is exactly or approximately proportional to the actual revenue received from a lead intermediary 140 rather than being equal to the revenue. Thus, the default revenue scores for the example given above may be "200" or another value that allows for meaningful calculations between cost scores and revenue scores.

In preferred embodiments, information about the default revenue scores assigned to the lead intermediary 140 is stored in the lead intermediary information repository 306.

Once a default revenue score has been assigned to the lead intermediary 140 based on actual revenue, other business considerations may be used to modify the revenue score, as will be described in more detail below, with reference the control/configuration module 310 that may be accessed by the system manager 300.

As depicted in FIG. 3A, the system manager 300 may access the control/configuration module 310 of the multi lead distribution system 100 in order to perform a variety of functions that influence the destination/scoring module 303. In particular, in preferred embodiments, the control/configuration module 310 allows the system manager 300 to manipulate values stored in the repository of control information 308 and/or in one or more of the other data repositories 305, 306, 307, which in turn allow the destination selection/scoring module 303 to advantageously select a set of lead intermediaries 140 in accordance with current business considerations of the entity operating the multi lead distribution system 100.

In particular, the control/configuration module 310 may allow the system manager 300 to adjust cost scores, revenue scores, and/or other factors used in selecting destinations in a number of ways. For example, if information stored in a repository of historical lead transaction information 309 indicates that a high percentage of past leads from a given lead portal 135 have ultimately proven to be fraudulent and have caused difficulties for the multi lead distribution system 100, then the system manager 300 may adjust the cost score for that lead portal 135 up to a higher value, thereby reflecting the additional "cost" of accepting leads from that portal 135. Alternatively, the system manager 300 may adjust a cost score down to reflect a business advantage of accepting leads from a given lead portal 135 or where the leads are shown to be of a higher quality resulting in a higher sales ratio, such that a higher price might be requested for the leads.

As another example, if a single entity owns both the multi lead distribution system 100 and one or more of the lead intermediaries 140, then the system manager 300 may use the control/configuration module 310 to access and adjust the revenue scores of the commonly owned lead intermediaries 140 in order to reflect a business advantage of forwarding leads to those lead intermediaries. As a reminder, margin score=revenue score−cost score. As will be described with reference to FIGS. 8A-8F, the margin scores are used for selection of destination pairings for each placement levels for the lead. By adjusting revenue scores upwards, the margin scores calculated for a given lead will be higher and will more likely result in a sale to the lead intermediary with the adjusted revenue score.

In some embodiments, some or all of the functions of the system manager 300 may be carried out by a person, or group of persons, interacting with the control/configuration module 310. In other embodiments, some or all of the functions of the system manager 300 may advantageously be completely or partially automated. The automated system manager 300 may be included, in whole or in part, in the control/configuration module 310, or may include some or all of the control/configuration module 310. For example, the system manager 300 may be a computer-implemented module, which may use Artificial Intelligence to automatically identify desired score modifications using learned algorithms based on input over the course of dealings with the lead portals 135, the lead intermediaries 140, and the suppliers 150, such as percentage of sales completed based on leads from each portal, and the like. Such learned algorithms may be based on one or more of a variety of methods, including, but not limited to: fuzzy logic, neural networks, genetic algorithms, rule-based systems, statistical analysis, and the like. The automated system manager 300 may be configured to access the control/configuration module 310 to implement the modifications.

In some embodiments, in addition to modifying scores and other decision factor values used by the destination selection/scoring module 303, the control/configuration module 310 may also be used by the system manager 300 to "register" a new lead portal 135 or lead intermediary 140 with the multi lead distribution system 100. Such registration advantageously includes entering information about the new lead portal 135 or the new lead intermediary 140 that may include, but is not limited to: contracted agreements, business rules and preferences, and business affiliations. Similarly, the control/configuration module 310 may also be used by the system manager 300 to subsequently update contractual and other information related to existing relationships with lead portals 135 and/or lead intermediaries 140. In various embodiments, an online form 900, such as the one depicted in FIG. 9 may be used to access and modify the decision factor data stored in the repositories.

As mentioned above, the multi lead distribution system 100 may further include the log of historical lead information 309, with information about leads that have been offered to and have been sold by the multi lead distribution system 100. Information in the historical lead log 309 may be useful to the system 100 for billing and payment purposes, for tracking the performance of leads from various lead portals 135, and for other managerial purposes.

Although, for ease of description, the multi lead distribution system 100 has been depicted in FIG. 3A as receiving leads from a single lead portal 135, the multi lead distribution system 100 is advantageously configured to receive leads from a plurality of different lead portals 135 at least approximately simultaneously.

Although the multi lead distribution system 100 has been depicted in FIG. 3A, as comprising a given configuration of modules and data repositories, in other embodiments, the functions of these modules and data repositories may be carried out by a different configuration of modules and data repositories. For example, although FIG. 3A, for ease of description is illustrated as having five discrete data repositories 305, 306, 307, 308, 309, in other embodiments, one or more of the repositories may be combined and/or the data repositories may be configured as a single interrelated repository, such as a relational database. Furthermore, although the repositories 305, 306, 307, 308, 309 of FIG. 3A are depicted as being housed internally to the multi lead distribution system 100, in other embodiments, some or all of one or more of the repositories may be housed externally or may be configured as a distributed system.

Figure 3B:
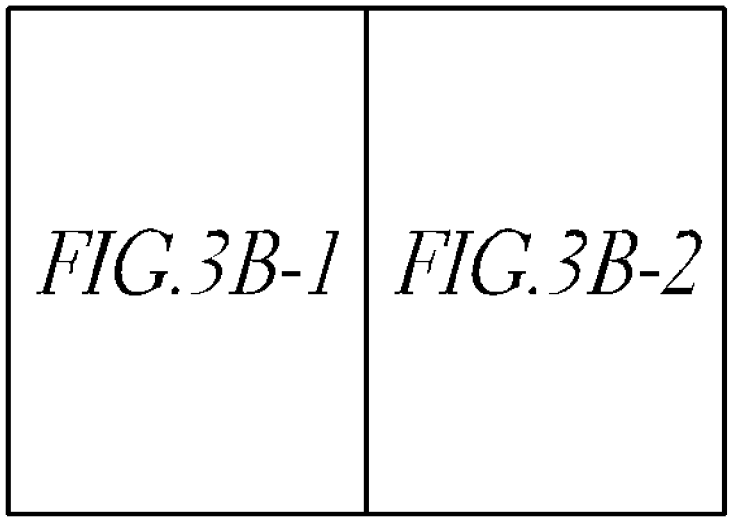
FIG. 3B, comprising FIG. 3B-1 and FIG. 3B-2, configured together as shown, is a block diagram that illustrates one embodiment of a logical component overview of a multi lead distribution system.
Figures 1, 3B:
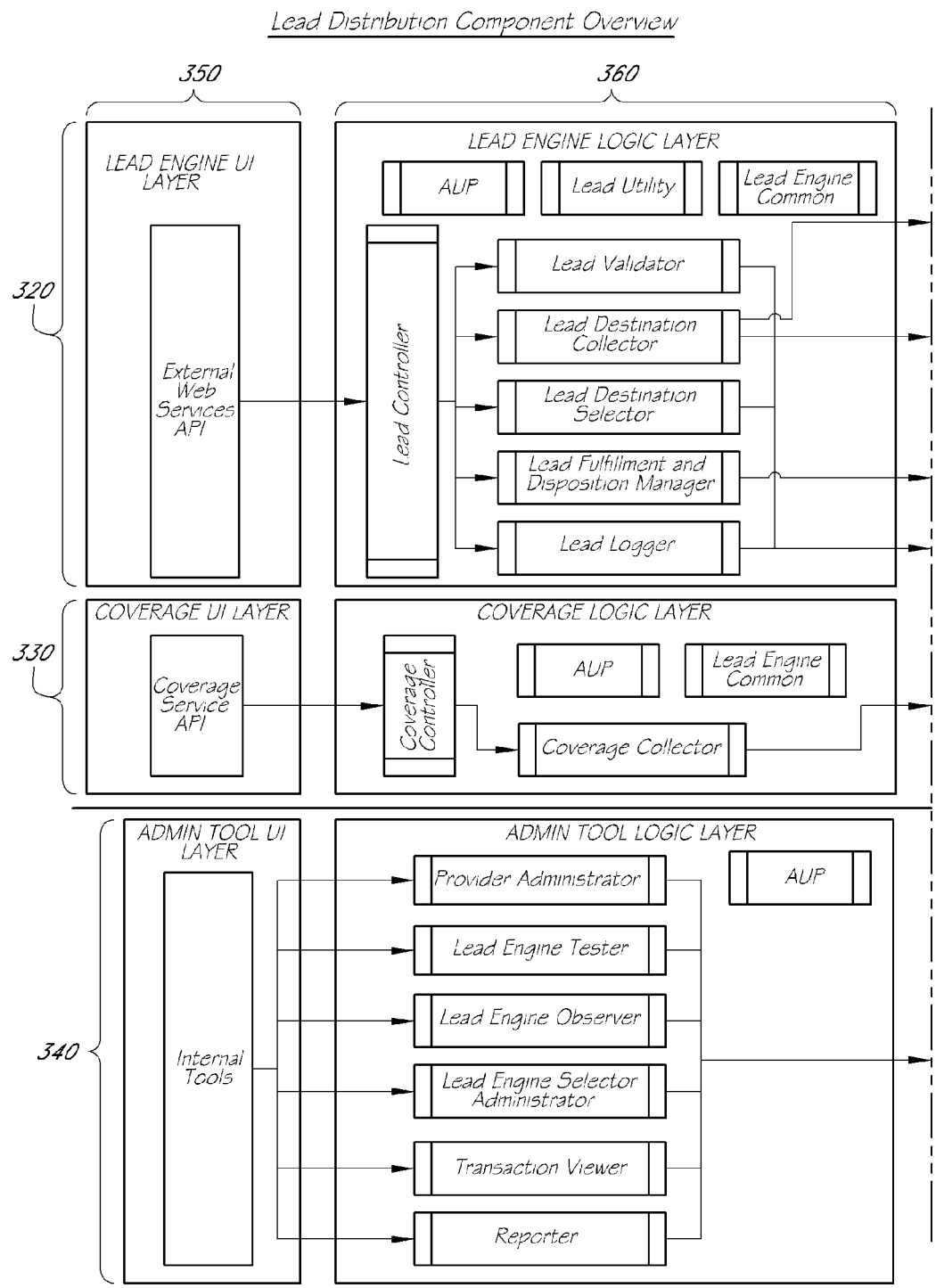

FIG. 3B is a block diagram that illustrates one embodiment of a logical component overview of a multi lead distribution system 100. The logical components depicted in FIG. 3B provide functionality at a lead engine layer 320, a coverage layer 330, and an administrative layer 340, as will be described in greater detail. Furthermore, each of the layers 320, 330, 340, includes components that provide user interface functionality 350 for the layer, components that provide the core functionality of the layer 360, components that provide logical access to associated data 370, as well as data persistence systems 380 for providing access to the associated data as it is physically stored in non-volatile memory, or, in the case of the lead engine level 320, as it is accessible via Internet or other computer network connection.

In a preferred embodiment, as depicted in FIG. 3B, the multi lead distribution system 100 is configured as a table-driven application that advantageously allows for implementing a policy-driven system, as illustrated in the example depicted in FIGS. 8A-8F. The system 100 is designed to accommodate ongoing change without need for rebuilding or for hard coding in system factors. The system uses a set of rules to describe specific policy goals and associated tables of data that are accessed in real time to implement those policy goals. Thus, the system lets changes in policy be applied in a simple, localized way that avoids or substantially reduces major recompilation and system builds.

In particular, the administrative layer 340 takes advantage of this system architecture to allow for frequent analysis and reconfiguration of the system business rules and policies that govern selection of a set of lead intermediaries 140 and/or suppliers 150 to whom to most advantageously route each lead. As depicted in FIG. 3B, the administrative layer comprises a provider administrator that oversees registration and input data reflective of contractual agreements regarding the lead portals 135. The administrative layer 340 further comprises a lead engine tester that tests lead pings and posts, and, in some embodiments, is advantageously configured to run 'what-if' simulations to assess the effects on profitability and overall system functionality of making individual policy changes in the form of modifications to blocking and selections rules used by the lead distribution engine. The administrative layer 340 further comprises a lead engine observer that allows for real-time observations of the functioning of the multi lead distribution system 100, a lead engine selector administrator that provides the system manager 300, described with reference to FIG. 3A, with an ability to implement the policies and business rules by manipulating values associated with the lead portals 135, the lead intermediaries 140, and the suppliers 150 that are stored in the system's data repositories 305, 306, 307, 308, which are also depicted in the data persistence layers of FIG. 3B. These components access a data cache in the administrative tool data layer which provides access to the associated stored data.

The coverage layer 330 of FIG. 3B is included as an example of a multi lead distribution system 100 that also carries out some or all of the functions of a lead intermediary 140 for a lead. Coverage may refer to geographical, product line, or other types of coverage relevant to leads of different types. For example, in the automobile lead industry, the geographical location of suppliers 150, as well as makes of new automobile sold are both relevant to distribution of the lead. The coverage layer 330, amongst other functions, stores information about and identifies suppliers 150 who are located within a specified geographical distance from a consumer 120 and/or who carry a requested automobile make as requested by the consumer associated with the lead. In some embodiments, inventory information about the suppliers 150 may be stored and accessed, allowing for identification of suppliers 150 with used automobiles of various makes, as well. The coverage layer 330 may additionally identify suppliers who have contracted with one or more intermediaries 140 for exclusive access to leads received through the one or more intermediaries 140 for a given geographical area, such as within one or more agreed upon zip code areas. In other lead markets, the coverage layer may operate to identify suppliers 150 and/or lead intermediaries 140 according to another relevant notion of coverage.

The coverage layer 330 may additionally or alternatively provide functionality associated with individual suppliers 150, such as tracking a number of leads routed to each supplier 150 within a given time period, so leads routed to suppliers 150 with, for example, monthly lead quotas may be advantageously managed. In preferred embodiments, the quota information associated with the suppliers 150 is updated dynamically, so that leads may be advantageously routed based on most current information.

The embodiment of the lead engine layer 330 depicted in FIG. 3B is based on a software component architecture that extends a web services interface for customers wanting to invoke the services of the multi lead distribution system 100. As depicted in the lead engine logic layer, a validation logic component that may be in communication with the Internet is invoked to validate an incoming lead ping or post. A lead destination collector logic component, also in communication with the Internet, as well as being configured to access an internal data cache, identifies a set of candidate destinations to which to offer an incoming lead ping or post. A lead fulfillment and disposition manager logic component carries out completion of a lead post transaction with a lead portal 135 and one or more lead intermediaries 140 and/or suppliers 150.

A lead logger component logs data about lead ping and post transactions, including information about dates and times at which the transactions occurred and what blocking and selection operations were carried out in identifying a set of destination to which to offer the lead. The logged information, stored in the historical lead log, as shown in the lead engine persistence layer and depicted in FIG. 3A as repository 309, provides raw base data for simulations that may be carried out by the system manager 300 to compare actual system performance with hypothetical performance based on system parameter modifications. This ability to play back a modified version of system performance may be used as a marketing point with lead portals 135 and/or lead intermediaries 140 that wish to optimize the profitability of their lead-related transactions with the multi lead distribution system 100.

Although the logical component overview of the multi lead distribution system 100 has been depicted in FIG. 3B, as comprising a given configuration of modules and data repositories, in other embodiments, the functions of these modules and data repositories may be carried out by a different configuration of modules and data repositories.

FIG. 4 is a block diagram that illustrates a flow of data in association with one embodiment of a multi lead distribution system 100. As depicted in FIG. 4, the data flow begins at data transfer 405 when the consumer submits a request for product information, including lead information, to a lead portal 135. At data transfer 410, the lead portal 135 uses partial lead information of the product information request to ping the multi lead distribution system 100. The lead portal interface module 301 of the multi lead distribution system 100 performs one or more validation operations on the incoming ping information in an attempt to detect and eliminate fraudulent or otherwise unusable lead information.

At data transfer 415, the multi lead distribution system 100 forwards the ping to an initial set of lead intermediaries 140 identified by the destination collection module 302. Note that some suppliers 150 may also be pinged directly 417 at this point. At data transfer 420, the lead intermediary 140 pings one or more suppliers 150 and/or other lead intermediaries 140 to inquire about their interest in purchasing the lead, and in data transfer 425, the suppliers 150 and/or other lead intermediaries 140 respond to the ping with an indication of their interest regarding the associated lead. At data transfer 430, the lead intermediaries 140 report back to the multi lead distribution system 100 about the suppliers' interest in the lead.

As an alternative, in some embodiments, one or more of the lead intermediaries 140 stores information about the suppliers 150 to whom they sell leads. One or more of the lead intermediaries 140 may then be able to assess the potential interest of one or more suppliers 150 with respect to the lead without need to contact the supplier 150 to inquire. At the alternative data transfer indicated by the dashed line 423, the lead intermediary 140 may report directly back to the multi lead distribution system 100.

Once the destination collection module 302 of the multi lead distribution system has received information about lead intermediaries 140 and suppliers 150 interested in the lead, the destination selection/scoring module 303 performs a series of operations on a list of lead intermediary/supplier pairings in order to identify a preferred set of lead intermediary/supplier pairings, also referred to herein as "destination pairings" to whom to sell the lead. In particular, the destination selection/scoring module 303 performs some exclusion rules to filter the list and to eliminate some of the potential recipients of the lead. The destination election/scoring module 303 further performs scoring to compare the various lead intermediary/supplier pairings and selection to identify a preferred set of lead intermediary/supplier pairings that attempt to maximize perceived benefit, both monetary and non-monetary, from the sale of the leads.

At data transfer 435, in some embodiments, the lead portal interface module 301 of the multi lead distribution system sends a list of the candidate suppliers 260 to the lead portal 135 for approval by the lead portal 135 and/or by the consumer 150. In other embodiments, the multi lead distribution system 100 simply sends to the lead portal 135 an indication of its interest in purchasing the lead. In such a case, if the lead portal 135 already has access to the consumer's full contact and lead information, the lead portal 135 can directly post the lead contact information, as indicated by dashed line 438.

In other embodiments, the lead portal interface module 301 may transmit back to the lead portal 135 a subset of supplier information 260 as an indication of its interest in purchasing the lead. In other embodiments, the information transmitted back to the lead portal 135 may contain a reservation number that carries with it a preferred placement of that lead for a limited time.

At data transfer 440, the lead portal 135 renders a web page for accepting the consumer's 120 contact information. At data transfer 445, the consumer 120 enters the contact information into the webpage for submission to the lead portal 135 (if this information has not already been entered). In embodiments where the consumer 120 is given an opportunity to indicate which, if any, suppliers 150 may not receive the consumer's contact information, data transfer 445 may also include information about the selected one or more suppliers 150. Note that if no further information is needed from the consumer 120, it is not necessary to contact the consumer at this point and this step may be eliminated as pointed out above.

At data transfer 450, the lead portal 135 posts the lead with full information for transmission to the multi lead distribution system 100. The multi lead distribution system 100 accepts the post and again validates the information in an effort to identify and eliminate fraudulent leads. In some embodiments, a separate backend process or contracted service may be used to identify and eliminate leads from the same consumer and for the same product that have been previously posted.

Once the post is validated, the multi lead distribution system 100 inquires in data transfer 455 to see if the lead intermediary 140 is still interested in the lead. If the lead has posted in only a very short time, such as seconds or only a few minutes, after the lead ping, then the likelihood is very high that a lead intermediary 140 or supplier 150 who indicated initial interest in the ping would still be interested in the post. However, if the consumer 120 let the webpage that requests the full contact information sit for an extended period of time, the chances increase that the lead intermediary 140 and/or supplier 150 will have already accepted another lead that keeps them from being interested or available for the lead post.

At data transfer 460, the lead intermediary 140 confirms to the multi lead distribution system 100 its continued interest in receiving the lead. The multi lead distribution system 100 re-performs its exclusion, scoring, and selection functions using up-to-date information in order to identify the intermediary/supplier pairings to which it wishes to sell the lead.

At this point, the multi lead distribution system 100 is ready to complete the transaction. In some embodiments, in data transfer 490, the multi lead distribution system 100 advantageously first attempts to contact the consumer directly in any of a variety of ways based upon the contact information provided to transmit a message about the posted lead. The multi lead distribution system 100 may use the success or failure of the contact(s) 490 as a form of validation to check that the consumer is authentic and that the lead is more likely, therefore, to be valid. At data transfer 465, the multi lead distribution system 100 posts the lead to the one or more selected lead intermediaries. At data transfer 470, the lead intermediaries 140 posts the lead to one or more suppliers 150. At this point, the supplier acknowledges to the lead intermediary 140 its acceptance of the lead and the lead intermediary 140 acknowledges to the multi lead distribution system 100 its acceptance of the lead. The multi lead distribution system 100 acknowledges to the lead portal 135 that the lead has been posted in data transfer 480, and the lead portal 135 acknowledges the post to the consumer 120 in data transfer 485.

In some embodiments, the multi lead distribution system 100 also contacts the selected suppliers 150 directly, as indicated with reference to data transfer 475, in which data about the lead, including consumer contact information and, in some embodiments, consumer comments and/or other additional information, is forwarded to the suppliers 150.

Once the lead has posted, in data transfer 495, the multi lead distribution system sends a record of the transaction to the historical lead log 309. In preferred embodiments, a record of the ping transaction is also sent to the historical lead log 309 by the multi lead distribution system 100 at approximately the time of data transfer 435, when the multi lead distribution system 100 responds to the lead portal's ping.

Portions of the description associated with the block diagram of FIG. 4 have been written, for ease of description, as if the multi lead distribution system 100 communicates with only a single lead intermediary 140 and/or as if the lead intermediary 140 communicates with only a single supplier 150. However, as has been explained throughout this disclosure, the multi lead distribution system 100 communicates with one or more than one lead intermediary 140 based on the candidate destinations identified for each lead ping and for each lead post. Similarly, the lead intermediary 140 communicates with one or more than one supplier 150, based on a possibility of interest in obtaining the lead on the part of the suppliers 150 to whom the lead intermediary 140 supplies leads. Although the multi lead distribution system 100 is depicted in FIG. 4 as communicating about a single lead with a single lead portal 135, the multi lead distribution system 100 preferably communicates with a plurality of lead portals 135, regarding one or more lead pings and lead posts each.

Furthermore, although, in some embodiments, the multi lead distribution system 100 posts the various postings of a given lead substantially simultaneously, in other embodiments, leads are posted at different times. For example, when a lead portal 135 allows a lead to be sold multiple times, the individual times may each be considered a "placement level". The portal 135 may in some embodiments, charge a higher price for a first placement level than for subsequent placement levels. In such an embodiment, a first placement level post for a lead may be posted earlier than subsequent placement levels for the same lead. For example, a period of time, such as one minute, or one hour, or another amount of time, may lapse between posting the leads to the destinations identified for each placement level. Additionally, in such embodiments, a lead intermediary may be willing to pay more for a lead placement level with an earlier posting time and may accordingly be assigned a plurality of revenue scores for posts of various placement levels. Lead intermediaries may also be advantageously assigned a plurality of revenue scores in other embodiments for other reasons.

Figure 5:
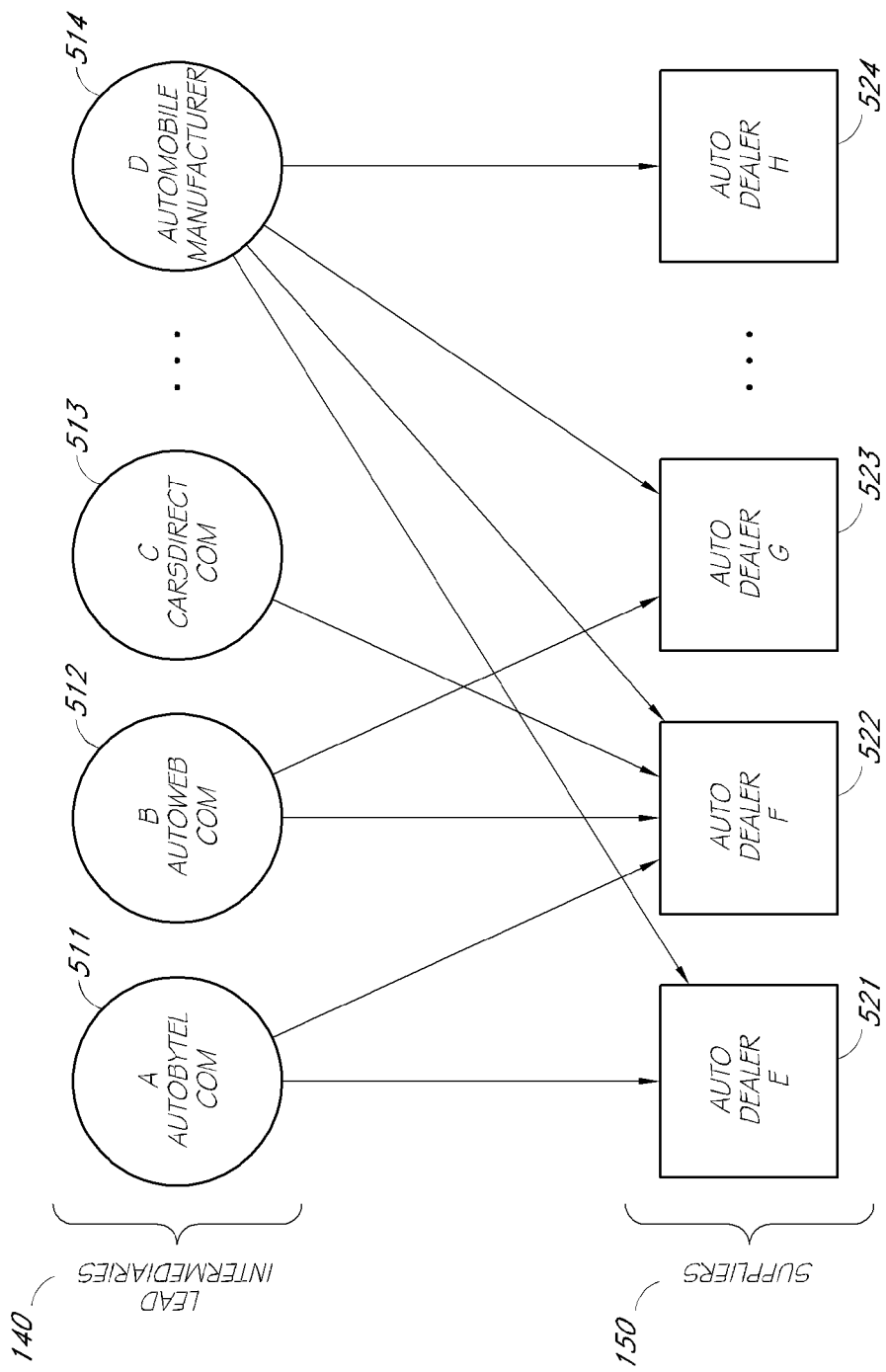
FIG. 5 is a block diagram that illustrates a sample set of relationships between a set of lead intermediaries and a set of suppliers.

FIG. 5 is a block diagram that illustrates a sample set of relationships between a set of lead intermediaries 140 and a set of suppliers 150. As has been described above, lead intermediaries are entities that purchase leads for use by or on behalf of suppliers 150 of the products and/or services of interest.

The example depicted in FIG. 5 is drawn from the automobile lead industry. However, the relationships described with reference to FIG. 5 may also be applicable, with or without modifications, to other types of lead industries. In the case of FIG. 5, three lead intermediaries A-C 511-513 are entities that operate online automobile lead aggregation services for aggregating and selling leads, either directly or indirectly, to automobile dealers 521-524. The lead intermediaries listed as examples in FIG. 5 are entities that may also operate lead portals 135 for generating leads from consumers 120. However, for purposes of FIG. 5, we consider only the aspects of these entities that perform the functions of lead intermediaries 140.

In FIG. 5, lead intermediary "D" 514 is an automobile manufacturer. It is common in the automobile industry for manufacturers, or entities operating on their behalf, to purchase and distribute leads to dealers 521-524 who sell their products. This service may be provided to the dealers 521-524 by the manufacturer 514 for free, for a fee, or under another type of business arrangement that is agreeable to the individual dealers 521-524 and the manufacturer 514. In some cases, an automobile manufacturer may charge a lower price for leads that it forwards to its own auto dealers than those auto dealers might have to pay if buying the lead from other types of lead intermediaries. In other industries, other types of entities, such as cooperative marketing groups, may, additionally or alternatively, operate as lead intermediaries for the suppliers.

In some embodiments, some automobile lead intermediaries 140 may enter into exclusive or semi-exclusive contracts with dealers from different geographical areas. Thus, a first lead intermediary 140 may advantageously agree that all leads that it receives from one zip code or from a contiguous set of zip codes, for example, will be forwarded exclusively to a single dealer 150 or to a limited set of dealers 150. A second lead intermediary 140 may advantageously find it desirable, instead, or in addition, to sell the leads to more than one supplier 150. The complexity that ensues from attempting to profitably and intelligently sell leads to a plurality of suppliers 150 is advantageously handled by the multi lead distribution system 100 in accordance with the embodiments disclosed herein.

In general, an auto dealer 521-524 may contract to purchase leads from one or more automobile lead intermediaries 511-514 of any of a variety of types in order to assist the dealer's sales personnel to identify buyers currently interested in purchasing an automobile. An individual relationship between an automobile dealer 150 and an auto lead intermediary 140 may advantageously specify a maximum number of leads that the lead intermediary 140 will provide to the auto dealer within a given period of time, such as a maximum of two hundred leads per month, or some other number per month, or per other time period. This amount is referred to herein as a "target" number of leads and is typically related to a maximum number of leads that the automobile dealership expects its sales force to be able to effectively process and respond to within the given time period, such as per month. In some embodiments, a slightly modified agreement may specify that any number of leads sent beyond the target number will be sent to the dealer at no cost or at a much reduced cost. The lead intermediary 140 may typically attempt to sell the dealer 150 as close as possible to the target number of leads within the time period in order to maximize its own sale of leads. In some embodiments, the target amount is also referred to as a "run stop" amount, and once the run stop amount of leads is reached for the time period, more leads are generally not routed to the supplier 150.

Furthermore, the lead intermediary 140 may track the number of leads sold to a dealer on a day-by-day or other advantageous, incremental basis. The lead intermediary 140 may use a "smoothing algorithm" to distribute sales of leads to suppliers 150 relatively evenly over the given time period, thus providing improved customer service for the dealer. In some embodiments the target daily amount may be known as a "run rate." The supplier's run rate may be calculated as a daily target, for example, or may accumulate over the course of a month so that a supplier 150 who has agreed to receive thirty leads per month should have received approximately seven by the end of the first week. In some embodiments, if the supplier 150 in the example has already received seven or eight leads, no more leads will be routed to the supplier 150 for at least another day, unless a lead is received from a lead portal 135 that has permission to override the run rate exclusion, as will be described in greater detail below.

An auto dealer 521-524 that chooses to aggressively pursue sales of its automobiles may contract to purchase leads from several automobile lead intermediaries 511-514. In FIG. 5, auto dealer "F" 522 has contracted to receive leads from at least four lead intermediaries 511-514, while auto dealer "H" 524 receives leads only from the manufacturer 514.

Typically, auto dealers will negotiate individually with the lead intermediaries 511-514 to determine the target number and the cost of leads from that lead intermediary. Thus, on a given day, the dealer may have already received its target number of leads from a first lead intermediary but may be available for accepting additional leads from a second lead intermediary from whom it has also contracted to receive leads.

As an example, illustrated in part by FIG. 5, it is possible that the multi lead distribution system 100 may inquire from each of the automobile lead intermediaries 511-514 whether there is interest in purchasing a lead for a given make and model of car in a given zip code. It may be that, of all the dealers in the geographical area, only dealer "F" 522 has the desired make and model automobile and is interested in purchasing the lead. If all four lead intermediaries 511-514 respond positively to the multi lead distribution system 100, indicating that they could sell the lead to dealer "F" 522, and if all four lead intermediaries 511-514 have been assigned different revenue scores for the leads they purchase from the multi lead distribution system 100, the multi lead distribution system 100 preferably determines to which lead intermediary 511-514 it will sell the lead to increase profit and other business advantages.

Figure 6A:
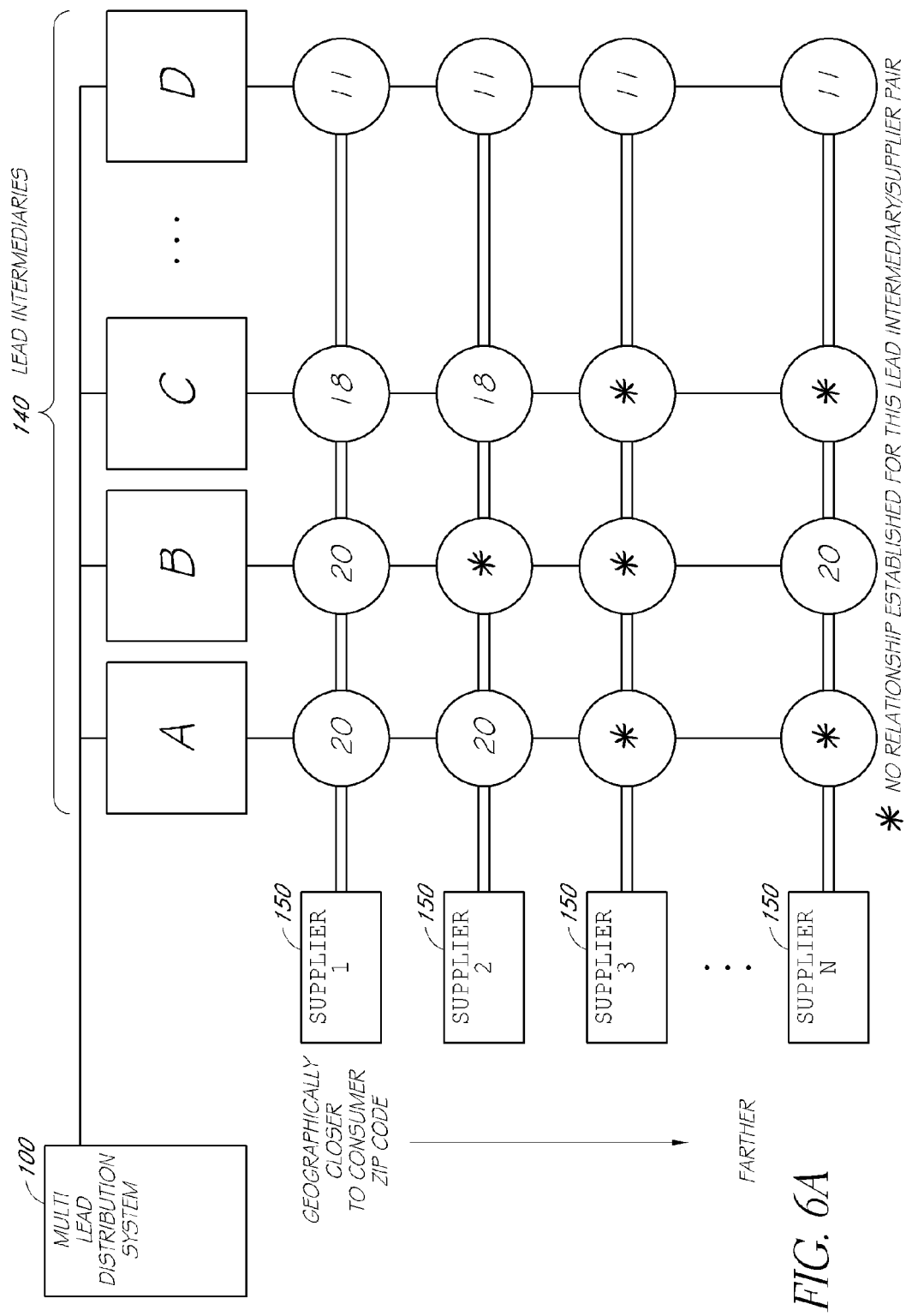
FIG. 6A is a block diagram that illustrates a set of selection considerations for one embodiment of a multi lead distribution system in determining a preferred set of lead intermediary/supplier pairs to whom to distribute a lead.

FIG. 6A is a block diagram that illustrates a set of selection considerations for one embodiment of a multi lead distribution system 100 in determining a preferred set of lead intermediary/supplier pairs to whom to distribute a lead. As has been described above, the multi lead distribution system 100 sends a notification of a potential lead (ping) to a set of lead intermediaries 140 and receives back a response indicating their tentative interest in purchasing the associated actual lead. In preferred embodiments, when the lead intermediaries 140 indicate their interest, each lead intermediary 140 also sends information identifying one or more suppliers 150 to whom the lead intermediary 140 is interested in selling the lead.

As was described with reference to FIG. 5, it is possible for a lead intermediary to provide leads to one or more than one supplier 150 who may be interested in a given lead. Similarly, it is possible for a supplier 150 to be offered a lead of interest by more than one lead intermediary 140. FIG. 6A depicts a hypothetical instance of this type of situation. In FIG. 6A, the lead intermediaries 140 who have expressed interest in a potential lead are listed across the top of the figure in squares that are labeled with letters A-D. Below the square of each lead intermediary 140 is a set of four circles. Each circle represents a potential supplier/intermediary relationship. Circles with an enclosed asterisk symbol (*) indicate intermediary/supplier pairings in which no relationship is currently established. Each circle with a number inside represents a supplier 150 to whom the lead intermediary 140 is actively interested in providing the lead in question. Each circle is positioned to the right of a rectangle naming the supplier to which the circle corresponds. Lead intermediary "A" is interested in providing the lead to supplier "1" and supplier "2." Lead intermediary "D" is interested in providing the lead to all of the suppliers 150 listed in FIG. 6A.

In the example of FIG. 6A, there are ten possible intermediary/supplier pairings that have established relationships and that may be interested in the lead. However, some of the pairings include the same supplier 150, and suppliers 150 typically do not want to receive the same lead twice. As will be described with below, embodiments of the multi lead distribution system 100 advantageously select a set of destinations for each lead such that no two destination pairings include the same supplier 150. In some embodiments, the multi lead distribution system 100 distributes leads to intermediaries 140 who do not provide information about the suppliers 150 to whom they distribute their leads. In such embodiments, a lead that is routed to more than one intermediary 140 may ultimately reach the same supplier 150 more than once.

Additionally, the multi lead distribution system 100 is typically not free to provide the lead to every lead intermediary/supplier pair that expresses any willingness to purchase the lead. Instead, contractual agreements with the lead portal 135 and/or with the lead intermediaries 140 may further limit the number of times the multi lead distribution system 100 may sell a lead or may limit to whom the lead can be sold. If, in the example of FIG. 6A, the multi lead distribution system 100 is able to sell the lead three times, the multi lead distribution system 100 is configured to identify a set of lead intermediary/supplier pairs that increases the profit or other business benefit to be earned from the sales. In preferred embodiments, the multi lead distribution system 100 identifies each possible sale as a "placement level" and calculates, for each placement level, a desired lead intermediary/supplier pair, referred to herein as a "destination pairing," to whom to sell the lead. In this example, there will be three placement levels.

The suppliers 150 depicted in FIG. 6A are listed in order of increasing geographical distance from a zip code identified by the consumer 120. However, instead of simply selecting the set of geographically closest suppliers 150, the multi lead distribution system 100 is able to select a set that increases profits for the multi lead distribution system while also accommodating business preferences of the lead portal 135 and lead intermediaries 140, and arguably providing the consumer with a better experience, as will be described in greater detail below.

In the example of FIG. 6A, the numbers in the circles represent a revenue score assigned by the multi lead distribution system 100 to the corresponding lead intermediary/supplier pair. Alternatively, the number may be seen to be indicative of the margin score of the lead intermediary/supplier pair, since the margin score for a lead intermediary/supplier pair equals the difference between their revenue score and the cost score of the lead portal 135 offering the lead. In preferred embodiments, the cost score for a given placement level is the same for all of the lead intermediary/supplier pairs, so destination pairs with a higher revenue score will also have a higher margin score at each placement level.

The multi lead distribution system 100, in various embodiments, identifies a group of candidate destination pairings that is frequently based generally on geography and on an abbreviated set of lead information, such as that provided by a ping. Once the candidate destination pairings have been identified, the multi lead distribution system 100 advantageously first takes profit and business advantage into account in selecting the destination pairings to which the lead will be offered and then factors in more precise geographical distance, provided that other overriding contractual arrangements with the lead portal 135 and/or lead intermediary 140 have not taken precedence. Thus, once an initial set of candidate destination pairings has been identified, margin score may be used as a first determining factor in selecting a preferred set of destination pairings, and then geographical distance used as a tie-breaker, if needed.

Using one embodiment of an algorithm for illustration with this example, at placement level "1," either pair A/1 or pair B/1 would be selected based on their higher revenue score (20) and Supplier "1"'s close proximity to the consumer's zip code of choice. Once selected, destination pairings that include Supplier "1" are preferably excluded from further calculations. At placement level "2," intermediary/supplier pair "A/2" would be selected with revenue score of 20 and a relatively close geographical distance. At placement level "3," intermediary/supplier pair "B/N" would be selected, also at a revenue score of 20.

It may be argued that, by this method, the consumer's contact information has been provided to a higher quality of suppliers 150 by this method, even though Supplier "N" is geographically farther away from the consumer's zip code than is Supplier "3." Supplier "N" has demonstrated a greater interest in contacting and serving consumer need by establishing relationships with more lead intermediaries 140 and being willing to pay more for leads than is Supplier "3" who only receives leads from the Intermediary "D" who sells leads to all the suppliers 150 at relatively low prices.

FIG. 6B displays one embodiment of set of formulae that may be used by the selection/scoring module 303 to help identify a preferred set of intermediary/supplier pairs (also known as destinations, or destination pairings) for receiving a lead. The formulae in FIG. 6B set forth a selection algorithm identifying a destination pairing based on margin score for a first placement level, a second placement level, and for any subsequent placement level.

Basically, the "selectedmargin" formulae state that the selected intermediary/supplier pair for each placement level will be the intermediary/supplier pair (of those eligible for placement at that placement level) with the maximum margin score for the level (the revenue score of the lead intermediary 140 minus the cost of the lead portal 135 for that level). When the maximum margin score for the level is a positive number, then a destination with that margin score is selected. In one embodiment, if more than one such destination exists, then one destination is selected from amongst the destinations with the highest margin score by selecting the destination whose supplier location is the shortest geographical distance from zip code provided by the consumer 120.

Describing the use of the algorithm in more detail, the procedure of FIG. 6B may be described as follows for each of the placement levels:

First, identify a set of candidate destinations for the lead at this placement level.

Temporarily apply to the set of candidate destinations any placement level exclusion rules, such as blocking, as will be described in greater detail with reference to FIGS. 8A-8F.

Determine the supplier(s) 150 with the maximum positive margin. The maximum positive margin for each intermediary/supplier pairing is calculated as the difference between the revenue score of the intermediary/supplier pairing and the cost score of the lead portal 135 for this placement level of the lead. This value is referred to as the maximum positive margin supplier.

Determine the supplier(s) with the maximum negative (smallest negative number) margin, which is defined as the difference between the revenue score and the cost score.

If the maximum margin is negative or equal to zero and the business rules of the data portal 135, as applied to the intermediary 140 and the placement number, allow for a negative margin score, then this value is referred to as the least loss margin.

If a maximum positive margin supplier exists, then select the maximum positive margin supplier as first placement.

If the maximum positive margin supplier does not exist and the least loss margin supplier exists, then select the least loss margin supplier as first placement.

Once a destination pairing has been selected for the first placement level, begin assembly of a set of candidate destinations for the second level as follows: Eliminate all candidate destination pairings that include the selected supplier from further placement eligibility, so that the supplier is not offered the same lead more than once.

In some embodiments, a limit is placed on the number of times a lead intermediary may be offered a given lead for distribution. For such embodiments, assembly of the set of candidate destinations for the second level continues as follows: Tally the number of times the selected intermediary 140 has been sent this lead for different suppliers 150. If the number of times the selected intermediary 140 has been sold is greater than or equal to a lead sell maximum value, eliminate all intermediary/supplier pairings with the same intermediary from further placement eligibility for this lead.

As depicted in FIG. 6B, the formulae are repeated in the same manner for each time that the lead will be placed, each time selecting one destination for the lead, then redefining the candidate list and reapplying the "selected margin" formula. At each placement level, the "selected margin" formula describes the calculations described with reference to FIG. 6A. The value "n" in the formulae refers to the number of intermediary/supplier pairs in the candidate list.

The process is repeated for up to the maximum number of placements allowed by the lead portal 135, unless one of the following termination triggers occurs: when no qualifying supplier (dealer) for this level exists, or when the number of sales of the lead exceeds maximum, or when zero potential candidate destinations remain.

As depicted in FIG. 6B, the algorithm can be repeated, with very little modification, for each placement level that has been permitted for a given lead. Although this disclosure includes sample embodiments in which the algorithm is repeated three times or four times, the algorithm as written advantageously does not have a hard-coded upper limit of times that it may be run. The limitations come instead from the values stored by the system 100 with regard to the lead portal 135.

Furthermore, as described with reference to FIG. 6B and with reference to FIGS. 8B-8F, the algorithm is described as iteratively selecting a supplier/intermediary pairing for each placement level, and ceasing to search for additional qualified suppliers when no qualifying supplier exists for at any given placement level. For example, once the selection module 303 determines that no qualified destination exists for a Level Two placement, no additional placements are attempted, even if four placements are allowed by the lead portal. Instead, the lead portal interface module 301 sends a response to the lead portal 135 indicating that only one placement of the lead will be made. In this type of embodiment, if no Level One placement is found, the lead is declined.

In other embodiments, the destination selection/scoring module 303 may be configured to assess cumulative margin scores for candidate destination pairings at all available placement levels before determining whether to terminate placement, and before determining whether to accept or to decline the offer of the lead. As an example, consider a lead that is available with a cost score of 13 for a first placement and 6 for two additional placements. If only two destination pairings, each with a revenue score of 12.50, are interested in the lead, rather than declining the lead due to a negative Level One margin score, the destination selection/scoring module 303 may be configured to determine that two placements of the lead would have a cumulative cost score of 19 (13+6) and a cumulative revenue score of 25 (12.50+12.50). The cumulative margin score is thus 6 (25−19). This embodiment of the multi distribution lead system 100 may thus be able to generate a monetary and/or business-related benefit for accepting two placements of the lead.

As will be familiar to one of ordinary skill in the art, in light of the present disclosure, additional modifications may be made to the selection and scoring algorithms of the system 100 within the intended scope of the present disclosure.

Figure 7A:
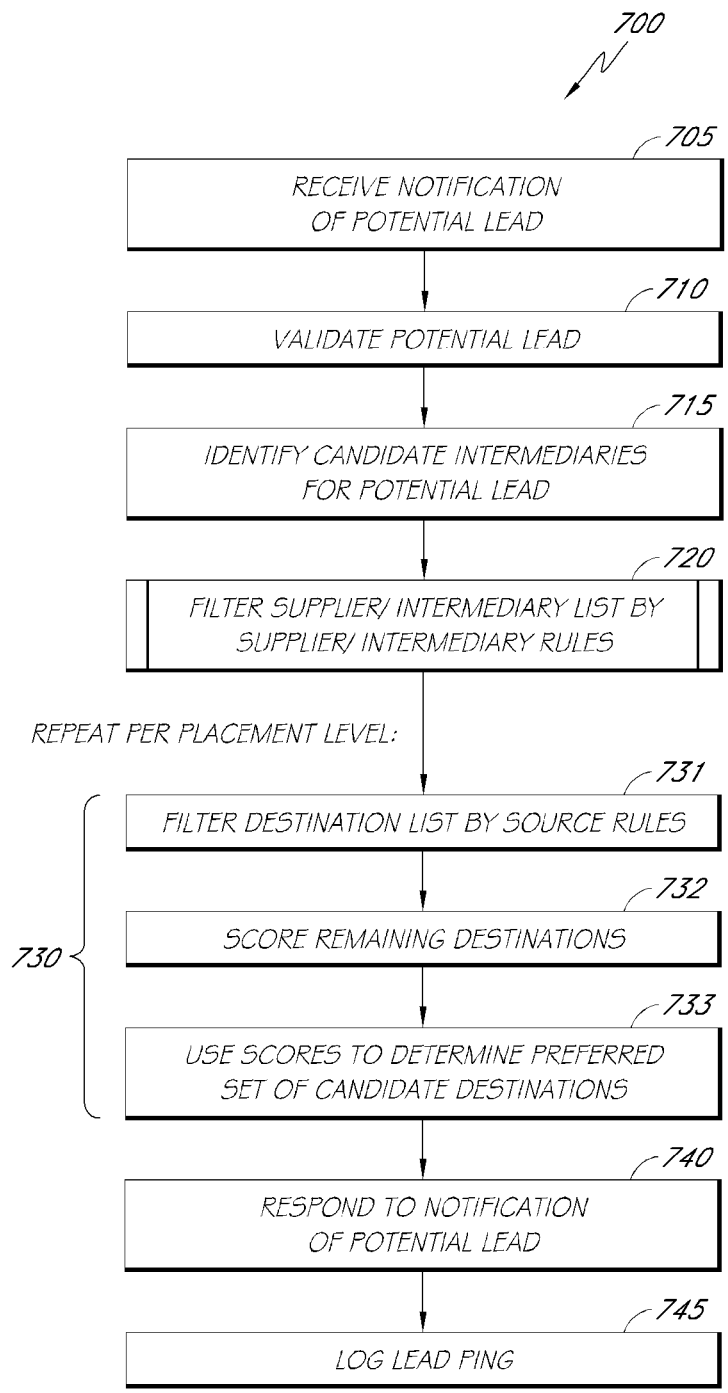
FIG. 7A is a flow chart that depicts one embodiment of a process for identifying a preferred set of candidate intermediary/supplier pairs for a potential lead.

FIG. 7A is a flow chart that depicts one embodiment of a process 700 for identifying a preferred set of candidate intermediary/supplier pairs (destinations) for a potential lead received from a lead portal 135. As depicted in FIG. 7A, the process begins at block 705 when the lead portal interface module 301 of the multi lead distribution system 100 receives notification of a potential lead, known in some lead industries as a ping. The potential lead advantageously includes an abbreviated set of information indicative of the consumer's interest and very general contact information, such as a zip code.

In block 710, the lead portal interface module 301 validates the potential lead, using any of a variety of validation techniques, including, for example, checking for invalid zip codes. In some embodiments, if the potential lead is suspected of being fraudulent, duplicative, or otherwise unusable, the multi lead distribution system 100 may return the potential lead to the lead portal 135 and/or may send the potential lead to a special service or program module for providing more in-depth analysis. In some embodiments, potential leads are assumed to be valid without checking.

If the lead portal interface module 301 determines that the potential lead does not appear to be fraudulent or unusable, the process passes to block 715, where the destination collection module 302 identifies a set of candidate intermediaries for the potential lead. In one embodiment, the destination collection module 302 identifies the set of candidate intermediaries for the potential lead from one or more stored repositories of information about lead intermediaries 140 and/or about suppliers 150. For example, in one embodiment, information about a set of suppliers 150 served by each lead intermediary 140 is stored in the lead intermediary information repository 306 together with location information and product information (such as automobile makes sold) for each supplier 150. Using this information, the destination collection module 302 of the multi lead distribution system 100 identifies lead intermediaries 140 that serve one or more suppliers 150 appropriate for the lead and sends ping information to the identified lead intermediaries 140.

In another embodiment, the destination collection module 302 identifies a set of candidate intermediaries for the potential lead by sending the potential lead to all or a large group of the lead intermediaries 140 with whom the multi lead distribution system 100 has established relationships. The destination collection module 302 waits to receive responses from the lead intermediaries 140 that are indicative of their interest or lack thereof with regard to the potential lead.

In one automotive-based embodiment, the destination collection module 302 checks internally stored information regarding the suppliers 150 with which the multi lead distribution system 100 has established relations to identify suppliers 150 within a desired geographical radius who sell a desired make of automobile to include as candidate destinations. In addition, the multi lead distribution system 100 pings all or some of the intermediaries 140. Intermediaries 140 who respond positively to the ping may be included in the set of candidate destinations.

In some embodiments, if the intermediary 140 responds with a list of one or more suppliers 150 to which the intermediary wishes to distribute the lead, the intermediary/supplier pairings are included with the other candidate destination pairings. If the intermediary 140 replies without listing a supplier 150, the intermediary 140 is temporarily blocked and set aside with a group of "wholesale destinations" which will be considered only if no suitable destination pairings are identified by the selection algorithm.

In still other embodiments, other methods for identifying a candidate group of destination pairings for a potential lead from which to select a preferred subset to whom to sell the associated lead may be used.

In block 720, the destination selection/scoring module 303 filters the list of candidate destinations for the potential lead, taking into consideration a set of one or more factors associated with the lead intermediaries 140, the suppliers 140, and/or the lead portal 135. In some embodiments, the factors may also include factors that are related to the candidate lead intermediaries 140 and/or the candidate suppliers 150 and that are set forth by the system manager 300 to modify the operational behavior of the multi lead distribution system 100. The process of block 720 will be discussed in greater detail with reference to FIG. 7B to follow.

Once the candidate set of destination pairings has been filtered by rules from the suppliers and/or intermediaries, a preferred set of destinations is identified, one pair per each placement level agreed upon with the lead portal 135. In one embodiment, all possible subset combinations of the desired size (the agreed-upon number of sales of the lead) from the set of candidate destinations are identified, such as, for example, all possible combinations of four destinations. The identified subset combinations are analyzed, and a preferred set of the destinations that provides a desired level of profit and business advantage is selected.

In a preferred embodiment, the election/scoring module 303 fills each placement level in turn, in order to advantageously limit the complexity of the analysis and to thereby more quickly identify a preferred set of destination pairings. In this preferred embodiment, in order to identify the intermediary/supplier pairs, a set of functions 730 is carried out iteratively for each placement level.

Beginning in block 731 the destination list is filtered by "source rules" associated with the lead portal 135. For example, in some embodiments, a low quality level associated with the lead portal may exclude the portal's lead from being offered by the multi lead distribution system 100 to suppliers 150 who are at or very near their daily target "run rate" or monthly "run stop" quotas. As another example, if a margin score associated with a destination pairing is negative for a current placement level, and if negative margins are not allowed for this destination pairing and this placement level, the destination pairing may be excluded from the selection at this placement level.

In block 732, the selection/scoring module 303 calculates a margin score for each candidate destination pairing that was not filtered out in block 731. As described above, the margin score is calculated as the difference between the revenue score for the lead intermediary 140 associated with the destination pairing and the cost score for the lead portal 135 for this placement level.

In block 733, once a margin score for each of the remaining candidate destination pairings has been calculated for the current level, a preferred candidate destination pairing for this placement level is selected.

The selection/scoring module 303 repeats set of functions 730 for each placement level to be filled. Thus, if the lead portal 135 allows for each of its leads to be sold four times, then four placement levels will be filled and the set of functions 730 will be carried out four times.

Once all of the placement levels have been filled, in block 740, the lead portal interface module 301 responds to the ping notification by indicating to the lead portal 135 whether or not it is interested in purchasing the lead based on whether or not suitable destination pairings for the ping were identified. In embodiments where the lead may be sold more than once, the multi lead distribution system 100 may indicate to the lead portal 135 how many uses of the lead it would like to purchase. Additionally, in some embodiments, the multi lead distribution system 100 may provide to the lead portal 135 a list of the suppliers 150 who are associated with the selected destinations.

In block 745, the multi lead distribution system 100 provides a record of the ping transaction to the historical lead log 309.

If the lead portal 135 wishes to proceed with sale of the lead, the process 700 passes on to a lead post process 750, which is described with reference to FIG. 7C below.

Figure 7B:
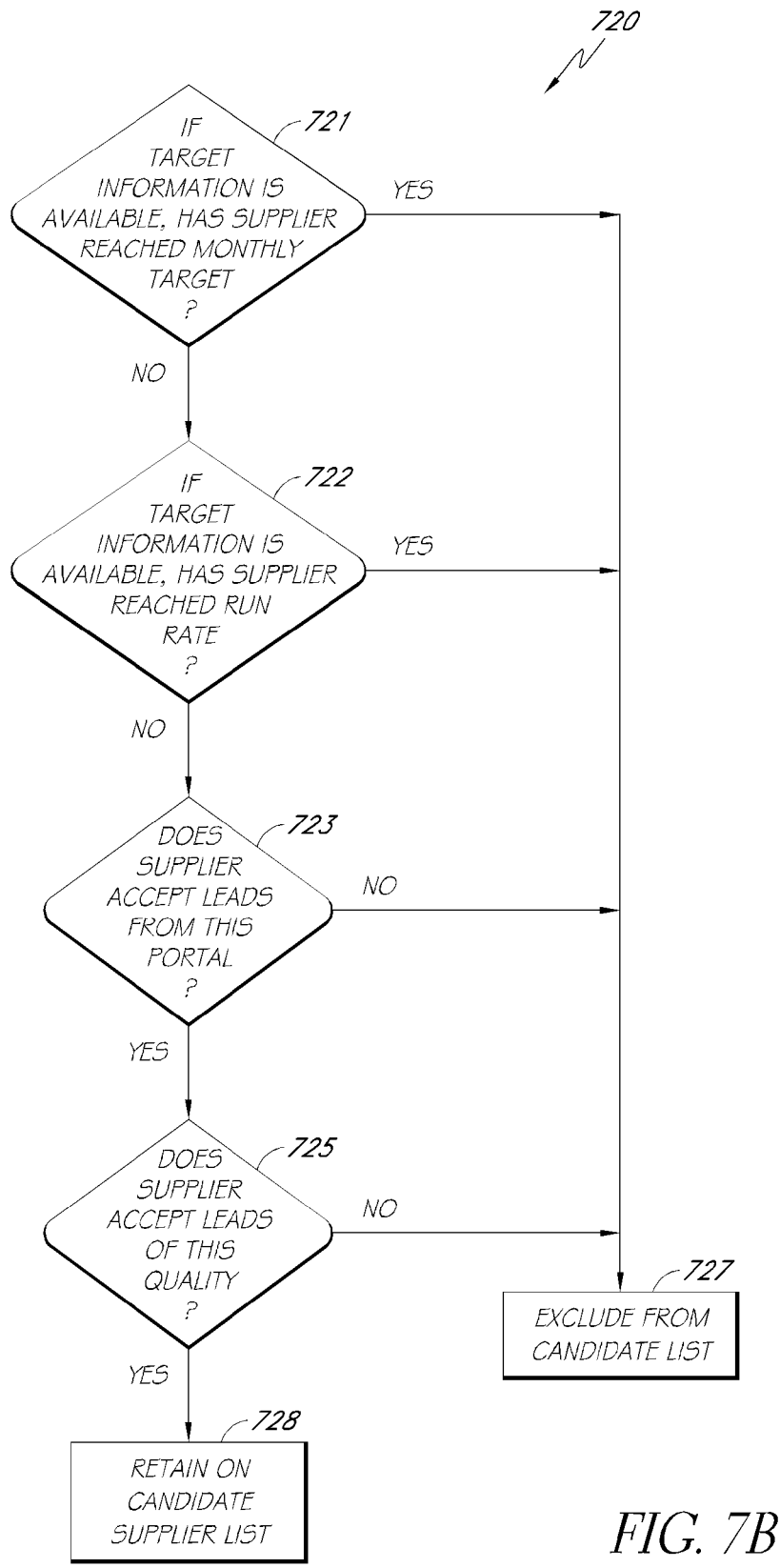
FIG. 7B is a flow chart that depicts a more detailed view of one embodiment of a process for filtering a set of candidate intermediary/supplier pairs.

FIG. 7B is a flow chart that depicts a more detailed view of one embodiment of a process 720 for filtering a set of candidate intermediary/supplier pairs that may be carried out by the destination selection/scoring module 303. The process 720 is carried out for each intermediary/supplier pairing.

In block 721, the process 720 determines, for those suppliers 150 for which monthly lead target (run stop) information is available, whether or not the supplier's run stop amount has been reached. If the supplier's run stop amount has been reached, the process 720 passes to block 727 and the intermediary/supplier pairing is excluded from the candidate list for this lead.

If the supplier's run stop amount has not yet been reached, the process 720 passes to block 722. In block 722, the process 720 determines, for those suppliers 150 for which daily lead (run rate) information is available, whether or not the supplier's run rate amount has been reached. In some embodiments, run rate is expressed as an actual number of leads routed to the lead supplier 150 to date for the period. In other embodiments, the run rate is expressed as a run rate score. If the supplier's run rate amount has been reached and if no rules allowing a run rate override have been invoked, the process 720 passes to block 727 and the intermediary/supplier pairing is excluded from the candidate list for this lead.

If the supplier's run rate amount has not yet been reached, or if a run rate override is involved, the process 720 passes to block 723. In block 723, the process 720 determines whether or not the system 100 allows leads from this lead portal 135 to be routed to this intermediary/supplier pairing. If the system 100 does not allow leads from this lead portal 135 to be routed to this intermediary/supplier pairing, the process 720 passes to block 727 and the intermediary/supplier pairing is excluded from the candidate list for this lead.

If the system 100 allows leads from this lead portal 135 to be routed to this intermediary/supplier pairing, the process 720 passes to block 725. In block 725, the process 720 determines whether or not the intermediary/supplier pairing accepts leads from portals of the quality level that is assigned to the lead portal 135. If the system 100 does not allow leads from a portal of this quality to be routed to this intermediary/supplier pairing, the process 720 passes to block 727 and the intermediary/supplier pairing is excluded from the candidate list for this lead.

If the intermediary/supplier pairing does accept leads from portals of this quality level the process 720 passes to block 728 and the intermediary/supplier pairing is retained on the candidate list for this lead. The process 720 passes on to block 731 of process 700 in FIG. 7A.

Figure 7C:
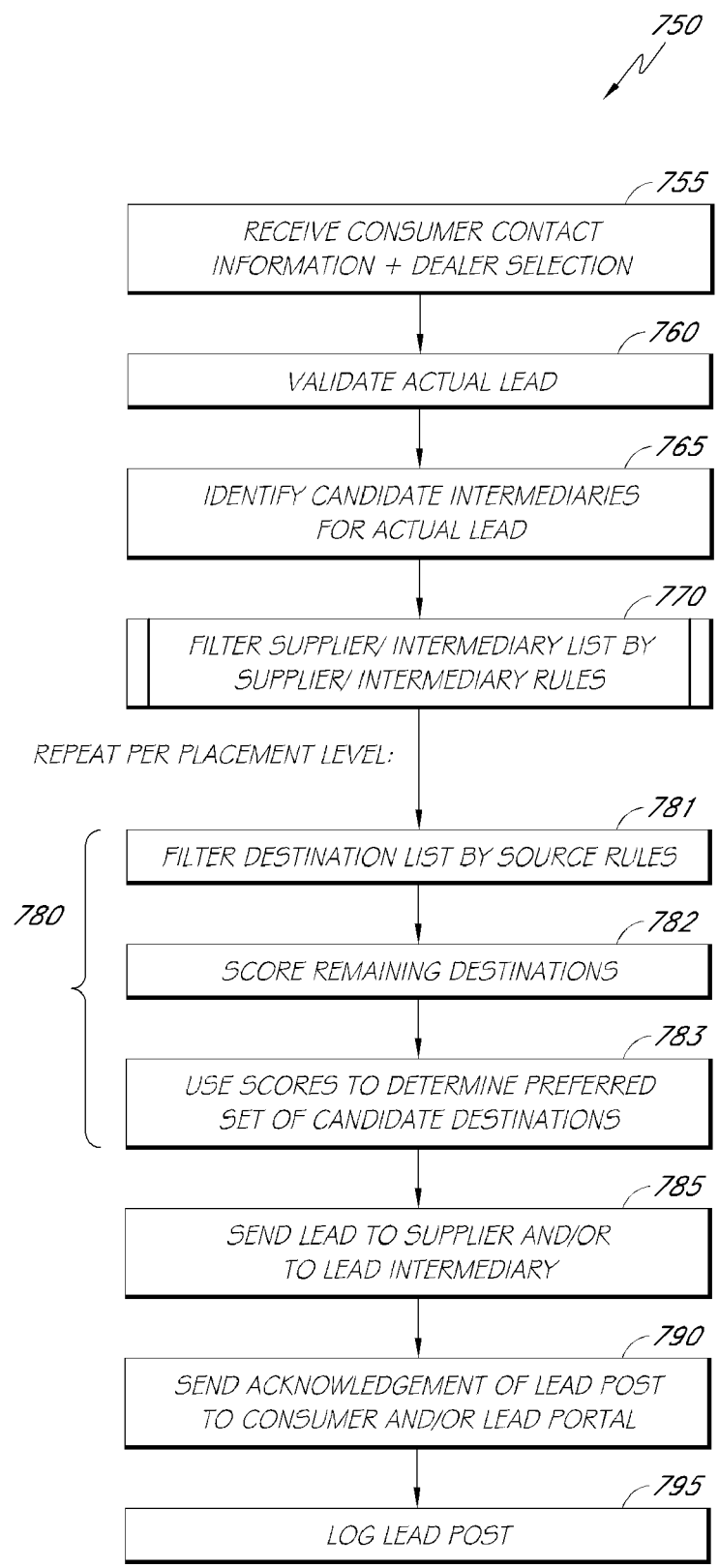
FIG. 7C is a flow chart that depicts one embodiment of a process for identifying a preferred set of intermediary/supplier pairs for a lead.

Process 770 from FIG. 7C is executed in the same manner as has been described with reference to process 720, although process 720 is applied to a lead ping, and process 770 is applied to a lead post.

FIG. 7C is a flow chart that depicts one embodiment of a process 750 for identifying a preferred set of intermediary/supplier pairs for a lead, which may occur, in some embodiments, if the lead portal 135 wishes to proceed with sale of the lead after acceptance of the lead ping in process 700, as described above with reference to FIG. 7A.

In block 755, the lead portal interface module 301 of the multi lead distribution system 100 receives consumer contact information associated with the lead post from the lead portal 135. In some embodiments the multi lead distribution system 100 also receives an indication of one or more candidate suppliers 150 selected by the consumer. The consumer contact information and other accompanying information constitute, at least in part, the lead post available for purchase by the multi lead distribution system 100.

As was described with reference to FIG. 4, in preferred embodiments, the lead post is validated by the lead portal interface module 301, and candidate destinations are filtered and scored by the selection/scoring module 303, in much the same manner as was carried out for the lead ping in order to advantageously take into account any changes that may have occurred since the associated lead ping was processed. For example, one or more suppliers 150, who expressed an interest in receiving the lead, in response to the associated ping, may have accepted one or more leads from other sources in the meantime and may no longer be currently interested in receiving additional leads. They may therefore decline the post.

In block 760, the lead portal interface module 301 validates the lead post, using any of a variety of validation techniques, including, for example, checking for invalid zip codes, names of famous persons, obscene words, invalid characters, or the like. In some embodiments, if the lead post is suspected of being fraudulent or duplicative, the lead portal interface module 301 may return the lead post to the lead portal 135 and/or may send the lead post to a special service or program module for providing more in-depth analysis. In some embodiments, lead posts are assumed to be valid without additional checking.

If the lead portal interface module 301 determines that the lead post does not appear to be fraudulent or duplicative, the process passes to block 765, where the destination collection module 302 identifies a set of candidate intermediary/suppliers for the lead post. In one embodiment, the destination collection module 302 identifies the set of candidate intermediary/suppliers for the lead post from one or more stored repositories information about lead intermediaries 140 and/or about suppliers 150. For example, in one embodiment, information about a set of suppliers 150 served by each lead intermediary 140 is stored in the lead intermediary information repository 306 together with location information and product information (such as automobile makes sold) for each supplier 150. Using this information, the destination collection module 302 of the multi lead distribution system 100 identifies lead intermediaries 140 that serve one or more suppliers 150 appropriate for the lead and sends lead post information to the identified lead intermediaries 140.

In another embodiment, the destination collection module 302 identifies a set of candidate intermediaries for the lead post by sending the lead post to all or a large group of the lead intermediaries 140 with whom the multi lead distribution system 100 has established relationships. The destination collection module 302 waits to receive responses from the lead intermediaries 140 that are indicative of their interest or lack thereof with regard to the lead post. In still other embodiments, other methods for identifying a candidate group of destinations for a lead from which to select a preferred subset of destinations to whom to sell the lead may be used.

In block 770, the destination selection/scoring module 303 filters the list of candidate destinations for the lead, taking into consideration a set of one or more rules associated with the lead intermediaries 140 and/or by the suppliers 140 in establishing the relationship with the multi lead distribution system 100. In some embodiments, the filter rules may also include rules that are related to the candidate lead intermediaries 140 and/or the candidate suppliers 150 and that are set forth by the system manager 300 to modify the operational behavior of the multi lead distribution system 100. The process of block 770 is analogous to the process of block 720 from FIG. 7A and which was discussed in greater detail with reference to FIG. 7B above.

Once the candidate set of destination pairings has been filtered by rules from the suppliers and/or intermediaries, a preferred set of destination pairings is identified, one pair per each placement level agreed upon with the lead portal 135. In one embodiment, all possible subset combinations of the desired size (the agreed number of sales for the lead) from the set of candidate destinations are identified. The subset combinations are analyzed, and a preferred set that provides a desired level of profit and business advantage is selected.

In a preferred embodiment, the destination selection/scoring module 303 fills each placement level in turn, in order to advantageously limit the complexity of the analysis and to thereby more quickly identify a preferred set of destinations. In this embodiment, in order to identify the intermediary/supplier pairs, a set of functions 780 is carried out iteratively for each placement level.

Beginning in block 781, destination selection/scoring module 303 filters the destination pairing list by source rules associated with the lead portal 135.

In block 782, the destination selection/scoring module 303 calculates a margin score for each candidate destination pairing that was not filtered out in block 781. As described above, the margin score is calculated as the difference between the revenue score for the lead intermediary 140 associated with the destination pairing and the cost score for the lead portal 135 for this placement level.

In block 783, once a margin score for each of the remaining candidate destination pairings has been calculated, the destination selection/scoring module 303 selects a preferred candidate destination pairing for this placement level.

The destination selection/scoring module 303 repeats set of functions 780 for each placement level to be filled. Thus, if the lead portal 135 allows for each of its leads to be sold four times, then four placement levels will be filled and the set of functions 780 will be carried out four times.

Once all of the placement levels have been filled, in block 785, the lead fulfillment module 304 posts the lead including the consumer contact information to the selected lead intermediaries 140 and/or directly to one or more suppliers 150. In various embodiments, the lead may be posted as an electronic mail notification, text message, facsimile, web-based notification, voice mail message, or other similarly expedited communication. In some embodiments, a paper (hard copy) of the lead may be subsequently sent to the intermediary 140 and/or to the supplier 150 for accounting and verification purposes. In some embodiments, leads are sent on an individual basis, and in some embodiments, leads for a given intermediary and/or supplier may be collected over a period of time, such as over an hour or a day or a part of a day, and sent as a batch communication.

In block 790, the lead portal interface module 301 sends a confirmation of the lead post to the lead portal 135 and/or to the consumer 120.

In block 795, the multi lead distribution system 100 provides a record of the post transaction to the historical lead log 309.

Although the processes 700, 720, 750 of FIGS. 7A, 7B, and 7C include functions that have been described, for clarity of description, as occurring in a given order, in other embodiments of the processes, the functions may occur in another order or may be differently organized. As one example, although the embodiment of the process 720 depicted in FIG. 7B describes a set of decisions that are carried out for each candidate destination pairing in turn, in other embodiments, each decision may instead be carried out for all of the candidate destination pairings before going on to the next decision, which is also carried out for all of the candidate destination pairings, or, in another embodiment, for all candidate destination pairings that were not excluded by the previous decision, and so forth. Similarly, in the processes 700, 750 for which embodiments are depicted in FIGS. 7A and 7C, when destination pairings are selected for each placement level, in processes 730 and 780, the order of the constituent functions may be altered to suit the needs of the multi lead distribution system 100.

Furthermore, other alterations to the embodiments depicted in FIGS. 7A-7C may be implemented without departing from the scope of the multi lead distribution system described herein. The monthly run stop target rate may pertain to a different time duration and/or some blocks may be combined with others and/or omitted.

Other variations will become apparent to one of skill in the art upon review of this disclosure and are contemplated as being included within the spirit and the scope of the invention disclosed herein.

FIGS. 8A through 8F depict a set of database tables 800, 820 that illustrate the operations undertaken by the destination selection/scoring module 303 of the multi lead distribution system 100 in identifying a preferred set of lead intermediary/dealer pairings to whom to send a lead ping or to sell the lead post for this automobile industry example.

FIG. 8A is a sample depiction of a database table 800 with an initial list of potential lead intermediaries 810 to whom a lead may be offered by one embodiment of the multi lead distribution system 100. In one embodiment, this set may be selected by accessing stored information about vehicle makes and models and zip codes served by the intermediary 140. The table 800 lists the set of lead intermediaries 140 who are pinged to determine their potential interest in purchasing the lead. Six intermediaries 810 have been included in the table 800, along with their revenue scores 814, and an indication 812 as to whether they accept leads from all lead portals 135. As indicated in column 812, a "NO" indicates that the lead intermediary does not accept leads from all portals and a "YES" indicates that the lead intermediary does accept leads from all portals. The table 800 indicates that only lead intermediaries "5" and "23" accept leads from all portals. As indicated in the Revenue Score column 814, the lead intermediaries 140 have been listed in order of decreasing revenue score.

Once the initial set of intermediaries 140 respond to the ping, preferably with a listing of one or more suppliers 150 each, the remaining set of interested candidate destinations (intermediary/supplier pairings) are processed by the destination selection/scoring module 303 in order to identify a preferred destination to which to route the potential (ping) or actual (post) lead for each placement level. In particular, various blocking and exclusion routines performed on the candidate destinations for each placement level further narrow the set of candidate destinations for each placement level. The margin scores of the remaining candidate destinations are compared, and a destination with a preferred margin score is selected, if one exists. The process is repeated for each placement level.

With regard to the blocking routines, the multi lead distribution system 100 is advantageously configured to provide for a hierarchy of blocking rules that apply to the lead portals 135, the intermediaries 140, and the placement levels, and that allow the system 100 to reflect a variety of business rules of varying degrees of complexity. If desired, at least a portion of the blocking rules may be included in the information stored when a lead portal 135 establishes a relationship with the multi lead distribution system. In this way, the system 100 accommodates the different business rules of individual portals 135 when distributing leads from the different portals 135. Changes to the blocking rules may be added by the system manager 300 at any time and/or may be invoked automatically by the control/configuration module 310. As will be illustrated in part with reference to FIGS. 8B-8F, the table-driven selection system of the multi lead distribution system 100 provides a logical structure for identifying an advantageous destination pairing for each placement level of a lead, if one exists. This logical structure allows the MLD 100 to retain a high level of flexibility. The configuration/control module 301, under the control of either a system manager 300 or a set of automated instructions, allows for manipulation of factors that interact with the logical structure of system exclusions and blocking rules to direct system behavior.

In general, the blocking rules that apply to more complex relationships override blocking rules that apply to less complex relationships. In a preferred embodiment of the multi lead distribution system 100, three levels of blocking exist: blocking based on Portal+Intermediary+Placement Level intersections, blocking based on Portal+Intermediary intersections, and blocking based on the Intermediary. As depicted the table below, if a blocking rule exists at the relatively complex Portal+Intermediary+Placement Level, it overrides any other blocking rule settings. If no blocking rules exist at the relatively complex Portal+Intermediary+Placement Level, then blocking rules at the Portal+Intermediary take precedence over the rules that are based on Intermediary alone.

TABLE 1

Blocking Rule Hierarchy Decision Table

| If Portal + Intermediary + Level Blocks allow placement | If Portal + Intermediary Blocks allow placement | If Intermediary Blocks allow placement | Resulting "Allow Placement" Value per Placement Level |
|---|---|---|---|
| True | any | any | True |
| False | any | any | False |

TABLE 1-continued

Blocking Rule Hierarchy Decision Table

| If Portal + Intermediary + Level Blocks allow placement | If Portal + Intermediary Blocks allow placement | If Intermediary Blocks allow placement | Resulting "Allow Placement" Value per Placement Level |
|---|---|---|---|
| Absent | True | any | True |
| Absent | False | any | False |
| Absent | Absent | True | True |
| Absent | Absent | False | False |

One example application of this hierarchy of blocking rules is described with reference to FIGS. 8B-8F to follow.

FIG. 8B is a depiction of a database table 820 which, in accordance with a preferred embodiment, is used to perform the selection and exclusion routines that are used to identify one or more preferred destinations for an offered lead. These routines may also be described as resolution routines for the values in the database table 820. In the example, the lead intermediaries 140 from FIG. 8A have been pinged, and if interested in purchasing the lead, have provided information about one or more dealers 150 to which they are interested in sending the lead. In FIG. 8B, the table 820 is populated with basic information about the intermediary/dealer pairings that will remain the same throughout the various iterations for each placement level.

In the example, the lead portal 135 allows for placement of the lead with up to four lead intermediary/dealer pairings. As will be described, an embodiment of the algorithm identifies a preferred intermediary/dealer pairing from amongst the entire set of available pairings for a "first placement level." Next, the algorithm iteratively identifies a preferred intermediary/supplier pairing for a "second placement level" from amongst the remaining intermediary/supplier pairings, and so forth, until all of the placement levels are full.

In FIG. 8B, each intermediary/dealer pairing also known as a "destination" is represented by one row in the table 820. The dealers 150 are listed in the "supplier_name" column 821 in order of increasing distance from the consumer's indicated zip code, as evidenced by the travel_distance column 825 and the postal_code column 826. The lead intermediary of each pairing is listed in the Intermediary_ID column 824. The example depicted in FIG. 8B is taken from a lead industry in which location of the supplier 150 is relevant to the placement of the lead. As has been described, in other embodiments, geographical information is not used to select a destination for the lead.

Of the six intermediaries from FIG. 8A who were pinged, only five have responded with an indication of interest in the lead. Intermediary "7" has been eliminated for lack of interest in the lead. Of the remaining intermediaries, number "1" has submitted three potential dealers (in rows 1, 4, and 6). Intermediary number "3" has submitted one potential dealer (in row 8). Intermediary number "5" has submitted one potential dealer (in row 2). Intermediary number "23" has submitted two potential dealers (in rows 5 and 7). Intermediary number "56" has submitted three potential dealers (in rows 3, 9, and 10).

Two different intermediaries have indicated an interest in selling the lead to Matthews Ford. As illustrated in the Revenue Score column 822, the perceived price that will be paid will be different depending on which intermediary is allowed to sell the lead to Matthews Ford. (A dealer 150 generally has no interest in paying twice for the same lead, and allowing a lead to be sold twice to the same dealer would provide poor customer service.) Similar situations exist for Rose Ford Uptown and Rose Ford Downtown.

The amount in the revenue column 822 matches the revenue listed for the same intermediary in FIG. 8A.

Columns 827 and 828 provide information about the target amount of leads for each of the dealers with respect to the paired intermediary. Thus, in Row "1," Matthews Ford has contracted to have purchased eight leads (column 828) from Intermediary #1 by this time in the month, but the actual number of leads purchased (as shown in column 827) is nine. Thus, the intermediary is already over-target for that dealer and an exclusion based on the "Run Rate/Run Stop" is indicated as "yes" (Y) in column 834. It is to be noted that in the embodiment shown in FIGS. 8A-8F, run rate and run stop are combined. In other embodiments, the two types of exclusions are addressed separately.

The same dealer, Matthews Ford, has a very different situation in row "2" with respect to intermediary number #5. Here, columns 827 and 828 indicate that the dealer has contracted to buy sixty leads from intermediary number #5, but they have so far bought only four. Accordingly, the exclusion flag in column 834 is set to "N." Similarly, for each of the destinations (rows), the values in column 834 reflect the values in columns 827 and 828.

As depicted in FIG. 8B, the multi lead distribution system 100 does not include lead target information for the dealers identified by lead intermediary #56 (rows "3," "9," and "10"). No values occur in columns 827 and 828, presumably because intermediary #56 is not affiliated with the multi lead distribution system 100 and does not provide access to lead target information to the multi lead distribution system 100. Thus, in column 834, no exclusions based on target amounts are listed for lead intermediary #56.

FIG. 8B depicts a partially populated table 820, because no placement level data has yet been entered. With regard to the three levels of blocking discussed with regard to Table 1. above, in FIG. 8B, only two of the three levels of hierarchy are present, and thus no decision based on the three levels of blocking can yet be made. Column 869 includes the blocking rule for the intermediary only, namely, the lowest priority of blocking rule: can this destination receive leads if no higher level rule overrides? Column 830 includes the blocking rule for the intermediary+lead portal, namely, the second lowest priority of blocking rule: can this intermediary receive leads from this portal? Since the table of FIG. 8B shows the values populated into the table before any placement level values have been entered, no values are in place for Column 831, which will hold the highest level blocking rule. Once Column 831 is populated, Column 832 will include the decision table result based on columns 829-831.

In this example, as seen in column 835, no destinations are excluded by a quality level assigned to the lead portal 135. However, in some embodiments, various lead destination pairings may have a business preference, either temporary or long-term that excludes receipt of leads from sources of given quality levels. In some situations the control/configuration module 310 may set a temporary quality level exclusion for a lead destination, such as, in order to reach an agreed upon average quality level of leads over a given time period.

Similarly, no destinations have blocked out leads for high demand vehicles (Column 836). However, in other examples, these types of blocking rules may apply. In particular, some destinations do not want to receive leads for cars that are, in any event, very easy to sell, and possibly hard to stock. In cases where high demand vehicle exclusions exist, an automobile make or model information from the ping is compared to a current listing of high demand vehicles, resulting in the values in column 836. In some embodiments, the listing of high demand vehicles may be determined by the intermediary 140 and/or by the supplier 150, and may be stored in an associated repository 306, 307.

FIG. 8C is a depiction of the database table of FIG. 8B, now populated for a first placement level selection of a destination for the lead. The values that have been added to Table 820 in FIG. 8C determine how the Level 1 Placement dealer/intermediary pairing is selected. Several empty columns of Table 820 from FIG. 8B have been populated in FIG. 8C. In particular, the Current Placement Margin Score column 823 has been filled in with values representing the margin score for a first lead being sold from the lead portal 135. Although not explicitly listed in the table 820, we can infer, as was described above, that the cost score for a first lead from this lead portal is "12" because the margin scores in column 823 are all twelve less than the revenue score in column 822.

Columns 824-828 remain the same from FIG. 8B to FIG. 8C.

Column 831 has been populated based on the Intermediary+Portal+Placement Level blocking rule: does this intermediary accept leads from this lead portal 135 for this level of lead. As depicted in FIG. 8B, the destination pairings that include supplier "23" or supplier "56" are blocked at this level. Using the decision rules from Table 1 above, and the values in columns 829-831, column 832 is populated, and several of the destinations are thereby excluded for this placement level.

The value in column 833 indicates whether a negative margin score is allowed for a destination selected at this level. In this example, no negative margin scores are allowed.

Column 837 includes a yes/no indicator that represents whether the dealer/intermediary pair is eligible for current placement at this level (currently Level 1), and is one of the columns that have been newly filled with values. The values in the Eligible for Current Placement Column 837 have been determined based on the exclusion values in Columns 832-836. At each placement level, and for each pairing, if any of the exclusion values in Columns 832-836 is marked "yes", then column 837 is marked "No" to show that the pairing is not eligible for this placement. In this embodiment, only if all the columns 832 and 834-836 are marked "No", signifying no exclusions, is the pairing eligible for a first level placement. In addition, in this embodiment, for subsequent placement levels, as will be described with reference to FIGS. 8D-8F, Column 838 indicates if the supplier 150 for each destination pairing has already been placed. Thus, for subsequent placement levels, in order to be a candidate for this placement, Columns 832 and 834-836 must be marked "No" and Column 838 must be empty or marked "No" for the previous levels.

Using this algorithm, only three rows (Rows "2," "6" and "8") are marked as being eligible for placement at this level. These are the candidate destinations for the current placement level.

At this stage, the Level 1 algorithms described with reference to FIG. 6B are invoked in order to select a destination for this level. Checking column 823 to see which of the eligible dealers has the highest margin score in column 823, we see that Amir Ford in Row 8 has a revenue score of 10.50, which is higher than any of the other eligible rows. Accordingly, Columns 838 and 839 are modified to indicate that Amir Ford will receive a lead via Lead Intermediary #3.

Figure 8D:
FIG. 8D is a depiction of the database table of FIG. 8C after one embodiment of the multi lead distribution system has selected a second supplier to whom to offer the lead.

FIG. 8D is a depiction of the database table of FIG. 8C, now populated for selecting a second destination for the lead. For the Level 2 Placement, the Margin Score values in Column 823 have been recalculated to take into account a new cost score for a second purchase of a given lead from this lead portal. We can see from the values in Column 823 that the cost score for a second lead is ten, and that all of the values in column 823 are ten less than the corresponding values in column 822.

Again, Columns 824-828 remain the same as from FIG. 8B.

Using the algorithm as described with reference to FIG. 8C, several rows (Rows "2," "3," "6," "7," "9" and "10") are marked as being eligible for placement at this level. Checking column 823 to see which of the candidate dealers has the highest margin score, we see that Matthews Ford in Row 2 has a revenue score of 11.00, which is higher than any of the other eligible rows. Accordingly, Columns 838 and 839 are modified to indicate that Matthews Ford will receive the lead via Lead Intermediary #5. As was described above, it is generally not acceptable for a dealer from a destination that has been placed to be placed again with another intermediary. Therefore, in this case, Column 838 is also modified to recognize that since Matthews Ford via Lead Intermediary #5 (Row 2) was placed, then Matthews Ford via Lead Intermediary #1# (Row 1) is also marked as already placed, and is thus excluded from being subsequently placed.

FIG. 8E is a depiction of the database table of FIG. 8D now populated for selecting a third destination for the lead, in accordance with data stored about the intersection of each data portal 135, intermediary 140, and placement level.

In FIG. 8E, six destinations remain eligible as indicated in Column 837, namely, those listed in rows, 3, 5-7, and 9-10. However, of the six, five have negative margin scores, which are not allowed for many of them, leaving only rows 5-7 as eligible candidates. The margin score information in Column 823 again implies a cost score of 10.00, and Rose Ford Downtown, in row 6, has the highest margin score of the three candidates. Accordingly, Rose Ford Downtown with intermediary #1 (in row 6) is selected for this placement level, and the same supplier, Rose Ford Downtown with intermediary #23 (in row 7), is excluded from further placement by being listed as already placed in Column 838.

FIG. 8F is a depiction of the database table of FIG. 8E now populated for selecting a fourth destination for the lead. In this iteration, all of the margin scores (in Column 823) for destinations that are eligible for this placement level (as noted in Column 837) are negative amounts. The values in Column 833 show that only one of the eligible destinations allows for placement with a negative margin, namely Rose Ford Uptown, with Intermediary #23 (row 7). Although Rose Ford Downtown with Intermediary #1 (row 6) provides a much higher margin score, that placement is blocked by the run rate exclusion (see columns 827, 828, and 834).

In summary, the example of FIGS. 8A-8F made the following final placements:

TABLE 2

Final Lead Placements

| Placement # | Placed Margin Score | Supplier Name | Intermediary ID |
|---|---|---|---|
| 1 | 10.50 | Amir Ford | 3 |
| 2 | 11.00 | Matthews Ford | 5 |
| 3 | 10.00 | Rose Ford Downtown | 1 |
| 4 | -1.00 | Rose Ford Uptown | 23 |

In addition, with regard to the remaining destinations, three were excluded because the supplier was placed through another intermediary, and three were excluded solely because of low margin scores.

FIGS. 8B-8F have provided a representation of one embodiment of a table 820 used by the selection/scoring module 303 to perform a resolution of data values associated with selection of a set of one or more destinations for a lead. As will be clear to one of ordinary skill in the art, in light of the present disclosure, the format and content of the table 820 may be modified in any of a number of ways for various other embodiments. In particular, the format of the table 820 is presented for ease of description as part of the present disclosure. In use, as part of the computerized multi-distribution system 100, the table 820 exists in any of a variety of advantageous processor-readable formats. In addition, although table 820 has been described as a database table 820, the data values used for the resolution process described may be organized in any of a variety of other advantageous processor-readable configurations available now or in the future.

FIG. 9 is a screen shot that illustrates one embodiment of a control configuration form 900 for managing embodiments of the multi lead distribution system 100. The sample configuration form 900 of FIG. 9 may be used by the system manager 300 to review and edit information about one of the lead portals 135, referred to in the screen as a "source." Entering data about the lead portal 135 in the control figuration form 900 of FIG. 9 updates data in the lead portal information repository 305 and/or the control information repository 308 which is used in the selection and exclusion algorithms of the destination selection/scoring module 303 to identify the preferred set of intermediary/supplier pairs to whom to sell the lead. Thus, control configuration form 900 may be seen as one type of table that performs as part of a logical table-driven resolution system for identifying advantageous distribution options for business leads and other opportunities.

Advantageously, the control configuration screen form 900 may be filled out when a new lead portal 135 enters into a contract to send leads to the multi lead distribution system 100. The form 900 may be updated when the lead portal 135 notifies the system manager 300 that there are changes to one or more of the business rules recorded in the form. The form 900 may also be updated under automated operation of the control/configuration module 310 or when the system manager 300 wishes to modify one or more of the values, as will be described in greater detail below, in order to modify how the multi lead distribution system 100 distributes and manages leads from the lead portal 135. Such changes can adjust the system's 100 behavior in order to increase profit and/or can adjust the system's 100 behavior in order to implement one or more desired business strategies. Changes to the data in the form 900 may affect how leads from the lead portal 135 are routed to lead intermediaries 140 and/or may affect whether leads from the lead portal 135 are accepted by the multi lead distribution system 100.

As depicted in FIG. 9, the form advantageously provides space to record a name and an identification number 905 for the lead portal 135. In some embodiments, a lead portal 135 may establish more than one "identity" with the multi lead distribution system 100 and may have different rules that apply to the each identity. For example, as seen in FIG. 9, a "product family" is listed as "new car." In some embodiments, a lead portal 135 may advantageously establish different rules for its new car leads than for its used car leads or automobile financing leads. In some embodiments, the configuration forms 900 for the different identities of the lead portal 135 may be linked. In other embodiments, the identities are managed separately, as if the two identities were two separate lead portals 135.

The form 900 also records in sections 910, 915, and 920, information about the lead portal (known here as a source group) that applies, at least in the form of default values that may be overridden by other system values, as will be explained below. For example, in section 910 of the configuration form 900, information may be input and displayed regarding whether the lead portal 135 allows its leads to be sold multiple times, and, if so, up to how many times. This information is used by the destination scoring/selection module 303 to determine how many intermediary/supplier pairs to identify. In the example depicted in FIG. 9, the lead portal 135 named, NXB Lead Distribution System, allows its leads to be sold up to four times.

In section 915, the form lists information about how the multi lead distribution system 100 will respond to pings and to posts from the lead portal 135. The sample configuration form 900 of FIG. 9 indicates that when the multi lead distribution system 100 responds to a ping, it should include information about the dealers to whom the consumer's contact information will be sent. In some embodiments, as was seen with reference to FIG. 2B, providing the supplier 150 information to the consumer 120 allows the consumer to indicate on the full lead submission form 240 to which of the suppliers 150 the consumer's contact information may be forwarded. In the example depicted in FIG. 9, a reply to an actual lead (post) may include confirmation information about acceptance of the post without including dealer information.

Section 920 of the form 900 includes information about an actual cost for purchasing leads from the lead portal 135 and an associated cost score, for each of the four sales of the lead agreed upon by the lead portal 135.

As depicted in the example of FIG. 9, the first use of a lead has a cost score of 12.00, while the three possible subsequent uses of the same lead may be purchased for less and have a cost score of 8.00 each. The cost score in the example is equal to the actual cost. However, the cost score is a value that may easily and advantageously be modified by the system manager 300 to reflect any of a wide variety of business considerations relevant to the system manager 300. For example, to enhance a likelihood of acceptance of leads from a given lead portal 135, the system manager 300 may lower the cost score, thereby increasing the margin score calculated for individual potential sales of leads from the lead portal 135. To decrease a likelihood of acceptance of leads from a given lead portal 135, the system manager 300 may increase the cost score, thereby decreasing the margin score calculated for individual potential sales of leads from the lead portal 135. Changing the cost score assigned to a lead portal 135 may advantageously be effected by the system manager 300 even when no change to the actual cost of leads obtained from the lead portal occurs. Thus, the system manager 300 may modify the behavior of the multi lead distribution system 100 while contractual agreements with the lead portal 135 remain unchanged, and, in fact, the lead portal 135 need not even know that the cost score has been changed. Furthermore, the costs score, as well as other modifiable values in the control configuration form 900, are values that may be used by the control/configuration module 310 to modify the behavior of the multi lead distribution system 100 while the multi lead distribution system 100 remains online and in operation. In some embodiments, modified values are entered into a cache in the repository of control information 309. Approximately, once an hour, or according to another advantageous schedule, the values used by the destination selection/scoring module 303 are updated to include the modified values from the cache.

Section 920 of the configuration form 900 also includes information about a quality rank assigned to the lead portal 135. In the sample configuration form shown in FIG. 9, the quality rank assigned to all four levels (corresponding to the four times that each lead from the portal may be sold) is "AA."

In one preferred embodiment, lead portals 135 are assigned a quality rank based, at least in part, on a perceived level of the quality of leads provided by the lead portal 135.

For example, one method of assessing a level of quality of the lead portal's leads is based on telephone surveys that may be carried out at three days after a lead from the lead portal 135 is posted, and again at ten days after a lead from the lead portal 135 is posted. In the third day telephone surveys, the consumer 120 associated with a lead may be called and asked about a level of satisfaction with the lead submission process and whether one or more of the suppliers 150 has contacted the consumer 120. At the ten-day telephone survey, the consumer 120 may be called again and further asked whether a business transaction associated with the type of lead, such as a purchase, has taken place, and, if so, whether the transaction was with one of the suppliers 150 who received the lead. These surveys could also be carried out using at least one of a number of well known computer-implemented survey programs, such as those accessible over the internet. The results may advantageously be supplied to the control/configuration module 310 of the multi lead distribution system 100 and, in some embodiments, used automatically to adjust quality scores as appropriate.

From the point of view of the intermediaries 140 and suppliers 150 who purchase leads, a lead of high quality is generally defined as a lead that results in a sale and a lead portal 135 that consistently generates leads with a higher frequency of associated sales may be considered to be a quality lead portal 135. In some embodiments, quality level may also refer, for example, to an average price range of the products associated with leads from a given portal 135. Other factors, such as convenience of doing business with the lead portal may also, in various embodiments, contribute to a quality level assignment.

Suppliers 150 who have run stop and run rate limitations on the leads they receive may be willing to exceed their usual daily target amount of leads in order to accept a lead from a lead portal that is know to be of high quality. Accordingly, in a preferred embodiment of the multi lead distribution system 100, lead portals are ranked according to a quality rank or grade that is based, at least in part, on the assessment of the lead portal's quality, and may be advantageously used to accelerate distribution of leads from high quality portals 135. For example, each quality rank may be associated with a numerical multiplier value that may be applied to a candidate destination's run rate before the run rate exclusions of the exclusion/selection process are carried out. Thus, if a supplier 150 has a target of three leads per day, and has already received sixty leads by the twentieth day of the month, a newly incoming lead with a numerical multiplier of 103% would temporarily "raise" the run rate to 61.8 for that lead, thereby avoiding a run-rate exclusion. With respect to the examples given in FIGS. 8B-8F, the lead portal's quality rank multiplier would be applied to the destination's run rate to calculate a temporary rolling target number of leads, as indicated in Column 828, for a lead from this portal.

In one embodiment, the following quality grades may be assigned, each with an associated multiplier:

| QUALITY RANK | MULTIPLIER |
| --- | --- |
| C | 85% |
| B | 100% |
| A | 103% |

| QUALITY RANK | MULTIPLIER |
|---|---|
| AB | 125% |
| AA | 150% |

In addition to the above-listed quality ranks, in one embodiment, a special quality rank of "ZZ" may be assigned to a top-performing one or very few lead portals 135 that allows the exclusion/selection procedures to ignore the run rates of candidate destinations, and to allow leads from the specially ranked portals 135 to be considered for delivery to the destinations until the destinations reach their run stop target amounts. One way of implementing such a run rate override ranking is to associate it with a very high multiplier, such as a multiplier of 1000% or even higher.

In some embodiments, the numerical multipliers are expressed as decimal number rather than as percentages. In still other embodiments, the numerical multipliers may be expressed as fractions. In some embodiments, quality grade multipliers may alternatively or additionally be applied to monthly run stop values, or to any other numerical blocking values used by the multi lead distribution system 100.

As depicted in FIG. 9, separate quality ranks may be assigned to the various placement levels that a lead portal 135 allows for its leads. In preferred embodiments, the control/configuration module 310 may be configured to advantageously modify one or more of the quality ranks in order, for example, to accelerate or decelerate distribution of leads from the lead portal 135. An ability to manipulate quality ranks, and to thereby manipulate the flow of leads of various desired qualities, allows the multi lead distribution system 100 to avoid having a disproportionate amount of leads from one type of lead source being sent to destinations. For example, some destinations provide a bonus, such as an extra payment, when they have been routed at least a threshold number of leads within a given time period. For such a destination, if a very high level of lead quality has been maintained during a given time period, and the multi lead distribution system 100 is close to being able to reach the threshold amount, it may be advantageous to allow a greater percentage of more abundant, lower quality leads to be routed to the destination, to "salt the mix" while maintaining an acceptable level of quality and increasing the number of leads to the destination.

In one embodiment, lead portals 135 assigned to one or more quality ranks may be temporarily further assigned by the system manager 300 to be included in a target override group that may be allowed to override a destination's run stop amount.

In some embodiments, the control/configuration module 310 may be advantageously configured to adjust quality levels over the course of a month or other time period, such that, for example, if the month will end on a weekend, or other typically slow time for leads, the acceptance of leads from specific lead portals 135 may be accelerated in advance of the end of the month by increasing the quality rank levels of the specific lead portals 135. The multi lead distribution system 100 advantageously allows for manipulation of these and other selection factors in order to modify system behavior. Changes made by the configuration/control module 310, such as by modifying a data value in the form 900, may, in some embodiments, immediately begin affecting selections of destinations for leads and other opportunities distributed by the system 100. In some embodiments, changed data values are available to the selection/scoring module 303 within minutes or within one hour or another advantageous time period.

The sample configuration form of FIG. 9 further comprises, in section 925, data about lead intermediaries such as a revenue score for each lead intermediary, which, as has been described above, may be modified by the control/configuration module 310. Such values are relevant to blocking that takes place on the destination level, as was depicted, for example, in column 829 of FIGS. 8B-8F. In the example shown in FIG. 9, section 925 further includes blocking data that pertains to the lead intermediary 140, such as a maximum distance the intermediary will allow between its suppliers 150 and the zip codes received in the leads. Although the multi lead distribution system 100 has been described as assigning one revenue score per intermediary 140, in other embodiments, intermediaries may be assigned at least two revenue scores for two different placement levels.

Section 930 describes overrides that apply to the lead intermediary and the lead portal together, as were depicted in column 830 of FIGS. 8B-8F. Section 935 includes data relevant to blocking that takes place for the lead portal, the destination, and the placement level, as was depicted in column 831 of FIGS. 8B-8F.

Sections 925, 930, and 935 as described, have pertained to a single lead intermediary. In preferred embodiments, Sections 925, 930, and 935 are repeated for each intermediary 140 to whom leads from the lead portal may be delivered.

It will be appreciated by those skilled in the art that the above-described system may be straightforwardly adapted or extended in various ways.

For example, although the system 100 has been described primarily as a multi lead distribution system, such as for multi-distributing business leads for consumer automobile purchases, in other embodiments, the system 100 may advantageously be used for other types of distribution, such as distribution of real-time opportunities for web page advertising space. Using the logic resolution and ping system described herein, the system 100 provides opportunities to purchase advertising space to businesses interested in such advertising space (typically as a banner or similar placement space around the borders of a web page). For purposes of the present disclosure, the term "business" includes any entity or sub-entity, including a government, individual, non-profit, political organization or charity that offers a service or a product or in any other way wants to reach out to others.

Figures 2, 3B:
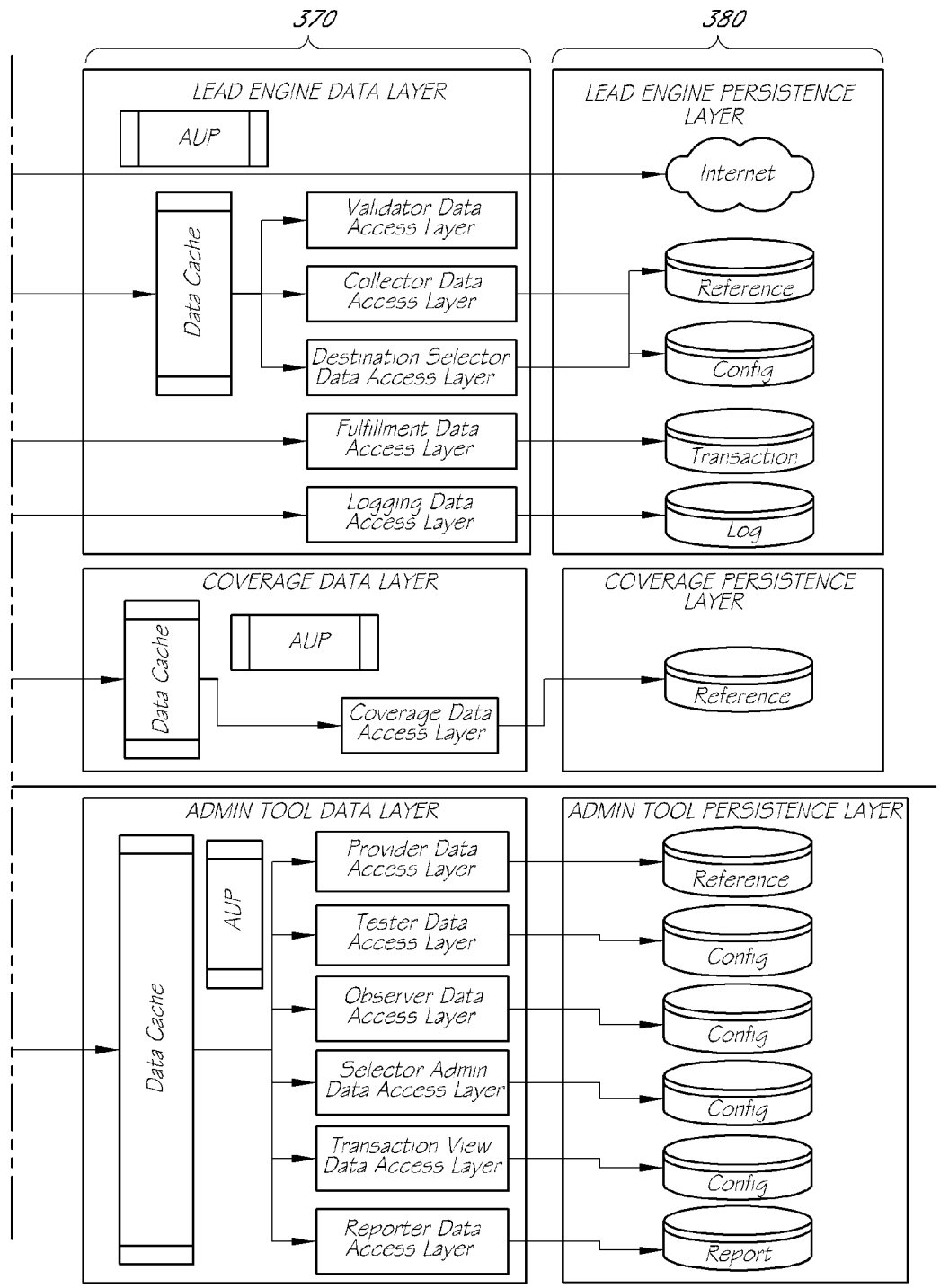

Referring back to FIGS. 1 and 2 for illustration, in one embodiment, the content provider 130 and the distribution system 100 have an established relationship for the purpose of offering advertising space to a plurality of suppliers 150 of goods and/or services, as well as to one or more intermediaries 140 who may purchase advertising space on behalf of the suppliers 150. The content provider 130 may offer several advertising placements, each with an associated cost score. For example, a banner ad space may be associated with a cost score of 0.30, a skyscraper ad space may be associated with a cost score of 0.25, and a lower placement ad space may be associated with a cost score of 0.15. The distribution system 100 stores this information as one or more initial cost scores associated with the content provider 130 in a manner analogous to having various cost scores for different placement levels of the same lead.

The consumers 120 access, via the Internet or other communications network 125, one or more web pages or other web content 135 provided by the content providers 130. The content provider 130, or an entity that handles advertising on behalf of the content provider 130 pings the interface module 301 of the distribution system 100 via the network 125 with a lead about a real-time opportunity to purchase advertising space on the web page 135 currently being viewed by the consumer 120.

The lead received from the content provider 130 preferably includes information about the web page 135 being viewed and/or about the consumer 120. To take an example from the automotive industry, the "ping" may include the following types of information: Page type (new car buy, or research, or photos); Make (Acura), Model (MDX), Trim (with navigation system), Location (Irvine, Calif.), Available ad placement locations (1, 2, & 3).

The destination collection module 302 of the distribution system 100 contacts or accesses stored information about one or more suppliers 150 (such as Original Equipment Manufacturers) and/or their intermediaries 140 (such as their advertisement agencies) with the ping information. In one embodiment, if the supplier 150 or intermediary 140 wishes to bid on the advertising opportunity, the supplier 150 or intermediary 140 transmits a response to the distribution system 100 that includes an indication of a monetary amount to be paid for each of the ad placements of interest.

The distribution system 100 stores the one or more indications of monetary amounts as initial revenue scores associated with each supplier 150 or intermediary 140 who responds to the ping. As has been described above, the system manager 300 may modify one or more initial cost scores and/or one or more initial revenue scores to reflect additional business considerations of the distribution system 100. For example, if the distribution system 100 is co-owned or otherwise affiliated with one of the suppliers 150 or intermediaries 140, an additional business consideration may be the fact that the distribution system 100 may benefit from the profit of the supplier 150 or intermediary 140. To reflect this consideration, and to cause the scoring module 303 to more frequently select the affiliated supplier 150 or intermediary 140 to "win" the ad placement, the system manager 300 may modify the relevant revenue scores upwards. As another example, the content provider 130 may offer a rebate to the distribution system 100 after a threshold number of ad placements are made within a given time period. In this situation, the system 300 may adjust the content provider's 130 cost score to be lower than the actual cost, to reflect this benefit and to cause the system 100 to more frequently accept offers to place ads received from the content provider 130.

The destination selection/scoring module 303 applies the logic, as has been described herein, including any associated blocking rules or other exclusions, and identifies a set of one or more suppliers 150 and/or intermediaries 140 who are eligible to purchase the ad space and who are associated with a highest margin score. As has been described earlier, given the same one or more cost scores for the ads, higher revenue scores will generate higher margin scores.

The interface module 301 then informs the content provider 130 whether the distribution system 100 wishes to purchase any ad space, and, if so, which placements. In some embodiments, the distribution system 100 comprises additional computer-readable storage for storing, for the one or more suppliers 150 and/or intermediaries 140, electronic versions of the ads to be placed or links to web-based copies of the ads to be placed, which the interface module 301 transmits to the content provider 130. In other embodiments, other methods are used for providing the ad content to the content provider 130, as will be familiar to one of ordinary skill in the art in light of the present disclosure.

In some embodiments, the revenue scores associated with the monetary values offered by the one or more suppliers 150 and/or intermediaries 140 are stored by the distribution system 100 for use in placing subsequent ads. Thus, once a supplier, for example, has offered a given amount for an ad placement, that amount and associated revenue score stay in the repository of supplier information 307 until overwritten, such as by a subsequent bid by the supplier 150. The stored revenue score may be used by the selection/scoring module 303 for subsequent ad placements. Thus, subsequent ad space may continue to be purchased on behalf of the supplier 150 for the same amount, (assuming that another supplier or intermediary does not "out-bid" the supplier in the interim) even if the supplier 150 does not respond to the subsequent pings. The supplier 150 may choose to dynamically raise the offered price at any ping. The supplier 150 may request that the revenue score be changed to a very low value if the supplier does not wish additional ad placements to be made without explicit supplier response.

With this system, suppliers 150 and intermediaries 140 may advertise online, using a system 100 that contacts them to offer advertising opportunities and that allows them to raise or lower their payment bid dynamically, effectively placing or removing their ad bid as they choose, without need to log on to an external website or static software platform of the content provider 130. The suppliers and intermediaries may respond to some or all of the pings, or may simply respond to when they wish to change their offered bid.

Additionally, in some embodiments, the distribution system 100 may distribute more than one commodity. For example, the multi-lead distribution system 100, as described herein, may distribute leads related to potential automobile purchases, while also distributing advertising space on the same web page being served to the consumer 120 or on another one.

In such embodiments, the system 100 may use two separate destination selection/scoring modules 303 or may use a single selection/scoring module 303 for identifying candidate destinations for the lead and advertising space. In some embodiments, the two resolutions are related in that when a supplier 150 or destination pairing that is interested in purchasing the automobile lead and is also interested in purchasing advertising space on the consumer's web page, the selection/scoring module(s) 303 may be configured to have one table-driven resolution operation affect the other. For example, the multi-lead distribution system 100 may be configured to encourage such a double-purchase by generating a reduced cost for one or both of the commodities. The data values that populate the tables for each of the opportunities change one or more values populating the other table, for example, temporarily modifying a revenue score or adjusting a quality level.

It will be appreciated by those skilled in the art that the above-described system may be straightforwardly adapted or extended in various additional ways. While certain embodiments of the invention have been described, these embodiments have been presented by way of example only, and are not intended to limit the scope of the invention. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. An opportunity distribution system that provides a business opportunity available for purchase to a selected set of one or more businesses, the system comprising:
   a processor in communication with computer readable storage that includes:

a data repository with stored data about candidate businesses for the business opportunity, wherein said stored data includes a least four different types of data values for each candidate business; and processor readable instructions configured such that, together with the processor, an opportunity distribution engine is implemented to:

populate said data repository with additional data values about said candidate businesses, wherein said additional data values are derived, at least in part, from said stored data values; and select, based at least in part on said stored data values and said additional data values in said data repository, a set of one or more candidate businesses permitted to purchase an opportunity to place an advertisement in each of one or more advertisement spaces on a webpage currently being served to a viewer.

2. The opportunity distribution system of claim 1, wherein said processor is further configured to cause one or more advertisements to be placed in one or more of the advertisement spaces on the webpage being served to the viewer on behalf of the one or more selected businesses.

3. The opportunity distribution system of claim 1, wherein a plurality of the one or more advertisement spaces on the webpage is associated with a cost that may be different from the cost of at least one other advertisement space on the webpage, said opportunity distribution engine being configured to use said data repository to select a business for each of said one or more advertisement spaces in order to obtain a preferred monetary or other business benefit.

4. An opportunity distribution system that provides a business opportunity available for purchase to a selected set of one or more businesses, the system comprising:

a processor in communication with computer readable storage that includes:

a data repository with stored data about candidate businesses for the business opportunity, wherein said stored data includes a least four different types of data values for each candidate business; and processor readable instructions configured such that, together with the processor, an opportunity distribution engine is implemented to:

populate said data repository with additional data values about said candidate businesses, wherein said additional data values are derived, at least in part, from said stored data values; and identify, based at least in part on said stored data values and said additional data values in said data repository, candidate businesses for an opportunity to place an advertisement on a webpage being served to a viewer and configured to identify candidate businesses for a business lead regarding a consumer interested in making a purchase.

5. The opportunity distribution system of claim 4, wherein said opportunity distribution engine is configured to identify when a candidate business for the first opportunity, which is the opportunity to place an advertisement on the webpage, is also a candidate business for the second business opportunity, which is the business lead regarding a consumer who is potentially interested in making a purchase, the opportunity distribution engine further configured to use the data values that populate the data repository for the first opportunity to change one or more data values that populate the data repository for the second opportunity, and/or- to use the data values that populate the data repository for the second opportunity to change one or more data values that populate the data repository for the first opportunity, for selecting the businesses for the first and second business opportunities.

6. The opportunity distribution system of claim 5, wherein the one or more data values that are changed affect a margin score that represents a level of monetary and/or other business benefit from providing the first opportunity or the second opportunity, or both, to one of the candidate businesses.

7. An opportunity distribution system that provides a business opportunity available for purchase to a selected set of one or more businesses, the system comprising:

a processor in communication with computer readable storage storing:

a data repository with stored data about candidate businesses for the business opportunity, wherein said stored data includes a least four different types of data values for each candidate business; and processor readable instructions configured such that, together with the processor, an opportunity distribution engine is implemented to:

populate said data repository with additional data values about said candidate businesses, wherein said additional data values are derived, at least in part, from said stored data values;

store, over the course of a selected time period, a historical log of said populated data repository and said selected set of candidate businesses, in addition to other populated data repositories used to select other sets of candidate businesses for other business opportunities during said selected time period;

make changes to one or more stored or derived future data values used to populate future data repositories in response to a review of said historical log;

identify changes to make by re-populating said data repositories in accordance with said changed future data values, selecting simulated sets of one or more candidate businesses, based, at least in part on said re-populated tables, and identifying business benefit results associated with said selected simulated sets of candidate businesses, and change the stored data in accordance with these results.

* * * * *

UNITED STATES PATENT AND TRADEMARK OFFICE
CERTIFICATE OF CORRECTION

PATENT NO. : 8,321,256 B2
APPLICATION NO. : 11/971823
DATED : November 27, 2012
INVENTOR(S) : Rose et al.

It is certified that error appears in the above-identified patent and that said Letters Patent is hereby corrected as shown below:

In the Specification

In column 1 at line 32, Change "2008as" to --2008 as--.

In column 1 at line 37, Change "2008as" to --2008 as--.

In column 1 at line 44, Change "2008as" to --2008 as--.

In column 6 at line 25, Change "protocol" to --protocol.--.

In column 14 at line 11, Change "135" to --135.--.

In column 46 at line 39 (approx.), Change "know" to --known--.

In the Claims

In column 51 at line 3, In Claim 1, Change "a least" to --at least--.

In column 51 at line 41 (approx.), In Claim 4, Change "a least" to --at least--.

In column 52 at line 11 (approx.), In Claim 5, Change "and/or-" to --and/or--.

In column 52 at line 27, In Claim 7, Change "a least" to --at least--.

Signed and Sealed this
Sixteenth Day of July, 2013

Teresa Stanek Rea
*Acting Director of the United States Patent and Trademark Office*